US012786843B2

(12) United States Patent
Yao et al.

(10) Patent No.: US 12,786,843 B2
(45) Date of Patent: Nov. 3, 2026

(54) ROUTE CONFIGURATION METHOD AND APPARATUS

(71) Applicant: HUAWEI TECHNOLOGIES CO., LTD., Shenzhen (CN)

(72) Inventors: Qi Yao, Beijing (CN); Wenfu Wu, Shanghai (CN); Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 545 days.

(21) Appl. No.: 18/154,356

(22) Filed: Jan. 13, 2023

(65) Prior Publication Data

US 2023/0171672 A1 Jun. 1, 2023

Related U.S. Application Data

(63) Continuation of application No. PCT/CN2021/105768, filed on Jul. 12, 2021.

(30) Foreign Application Priority Data

Jul. 17, 2020 (CN) ......................... 202010694042.5

(51) Int. Cl.
*H04W 40/24* (2009.01)

(52) U.S. Cl.
CPC .................................. *H04W 40/24* (2013.01)

(58) Field of Classification Search
None
See application file for complete search history.

(56) References Cited

U.S. PATENT DOCUMENTS

2019/0158408 A1* 5/2019 Li ......................... H04W 72/56
2020/0228936 A1* 7/2020 Talebi Fard ............ H04W 4/08
2020/0351984 A1* 11/2020 Talebi Fard ............ H04W 4/08
2021/0168902 A1* 6/2021 Wang .................... H04W 76/11
2021/0259047 A1* 8/2021 Liu ....................... H04W 80/04
2022/0078047 A1* 3/2022 Yao ......................... H04W 4/08
2022/0150166 A1* 5/2022 Yang .................. H04L 12/4633

OTHER PUBLICATIONS

Extended European Search Report issued in corresponding European Application No. 21841311.0, dated Nov. 27, 2023, pp. 1-11.

* cited by examiner

*Primary Examiner* — Brian S Roberts
(74) *Attorney, Agent, or Firm* — HAUPTMAN HAM, LLP

(57) ABSTRACT

A route configuration method includes determining, by a session management network element, that a first terminal in a first group is allowed to communicate with a second terminal in a second group. The route configuration method further includes sending, by the session management network element, first forwarding information to a first user plane network element. The first user plane network element is configured to provide a service for the first terminal. The first forwarding information is useable by the first user plane network element to forward a first packet. The first packet is to be sent by the first terminal to the second terminal.

20 Claims, 9 Drawing Sheets

ROUTE CONFIGURATION METHOD AND APPARATUS

CROSS-REFERENCE TO RELATED APPLICATIONS

This application is a continuation of International Application No. PCT/CN2021/105768, filed on Jul. 12, 2021, which claims priority to Chinese Patent Application No. 202010694042.5, filed on Jul. 17, 2020. The disclosures of the aforementioned applications are hereby incorporated by reference in their entireties.

TECHNICAL FIELD

This application relates to the field of communication technologies, and in particular, to a route configuration method and an apparatus.

BACKGROUND

A fifth generation (5th generation, 5G) virtual network (5G virtual network, 5GVN) (which may also be referred to as a 5G local area network (local area network, 5GLAN)) service is a service provided by a current 5G network. The 5GVN service is mainly applied to home communication, enterprise office, factory manufacturing, internet of vehicles, power grid reconstruction, public security organs, or the like. The 5GVN service can provide private communication of an internet protocol (internet protocol, IP) type or a non-IP type (such as an Ethernet type) for two or more terminal devices in a group of terminal devices. For example, devices in a factory form a group, and different devices may send ethernet data packets to each other. Alternatively, office devices (such as mobile phones, computers, or laptop computers) of employees in a department of an enterprise form a group, and different office devices may send IP data packets to each other.

Currently, if two terminals are not in a same group, the two terminals cannot communicate with each other. However, in some scenarios, users expect that two terminals in different groups may communicate with each other. For this case, a conventional technology does not provide a solution.

SUMMARY

This application provides a route configuration method and an apparatus, to resolve a problem that terminals in two groups cannot communicate with each other in a conventional technology.

According to a first aspect, a route configuration method is provided. The method includes: A session management network element determines that a first terminal in a first group is allowed to communicate with a second terminal in a second group. The session management network element sends first forwarding information to a first user plane network element, where the first user plane network element is a user plane network element that provides a service for the first terminal, the first forwarding information is used by the first user plane network element to forward a first packet, and the first packet is a packet to be sent by the first terminal to the second terminal.

In this way, after the first user plane network element receives the first packet, the first user plane network element may forward the first packet based on the first forwarding information, so that a problem that terminals in two groups cannot communicate with each other in a conventional technology can be resolved.

In a possible design, when the first user plane network element and a second user plane network element are not a same user plane network element, the first forwarding information is specifically used by the first user plane network element to forward the first packet to the second user plane network element, and the second user plane network element is a user plane network element that provides a service for the second terminal.

In a possible design, when the first user plane network element and a second user plane network element are a same user plane network element, the first forwarding information is specifically used by the first user plane network element to forward the first packet to a second access network device, the second user plane network element is a user plane network element that provides a service for the second terminal, and the second access network device is an access network device that the second terminal accesses.

In a possible design, the first forwarding information is specifically used by the first user plane network element to forward the first packet to a first forwarding device, and the first forwarding device is responsible for forwarding a packet destined for a terminal in the second group. Based on this design, the first forwarding device is configured to be responsible for forwarding the packet destined for the terminal in the second group, so that configuration complexity of forwarding information can be reduced.

In a possible design, the first forwarding device is one of user plane network elements that provide a service for one or more terminals in the second group, or the first forwarding device is a device other than a user plane network element that provides a service for one or more terminals in the second group.

In a possible design, the method further includes: The session management network element sends fourth forwarding information to the first forwarding device, where the fourth forwarding information is used by the first forwarding device to forward the first packet.

In a possible design, when the first forwarding device is a device other than a second user plane network element, the fourth forwarding information is specifically used by the first forwarding device to forward the first packet to the second user plane network element.

In a possible design, the method further includes: The session management network element sends second forwarding information to the second user plane network element, where the second forwarding information is used by the second user plane network element to forward a second packet, the second packet is a packet to be sent by the second terminal to the first terminal, and the second user plane network element is the user plane network element that provides a service for the second terminal. Based on this design, after the second user plane network element receives the second packet, the second user plane network element may forward the second packet based on the second forwarding information, so that the problem that terminals in two groups cannot communicate with each other in a conventional technology can be resolved.

In a possible design, when the first user plane network element and the second user plane network element are not a same user plane network element, the second forwarding information is specifically used by the second user plane network element to forward the second packet to the first user plane network element.

In a possible design, when the first user plane network element and a second user plane network element are a same user plane network element, the second forwarding information is specifically used by the second user plane network element to forward the second packet to a first access network device, and the first access network device is an access network device that the first terminal accesses.

In a possible design, the second forwarding information is specifically used by the second user plane network element to forward the second packet to a second forwarding device, and the second forwarding device is responsible for forwarding a packet destined for a terminal in the first group.

In a possible design, the second forwarding device is one of user plane network elements that provide a service for one or more terminals in the first group, or the second forwarding device is a device other than a user plane network element that provides a service for one or more terminals in the first group.

In a possible design, the method further includes: The session management network element sends third forwarding information to the second forwarding device, where the third forwarding information is used by the second forwarding device to forward the second packet.

In a possible design, when the second forwarding device is a device other than the first user plane network element, the third forwarding information is specifically used by the second forwarding device to forward the second packet to the first user plane network element.

In a possible design, the second terminal is a terminal in the second group that has permission to communicate with the first terminal and that is in an online state.

In a possible design, the method further includes: The session management network element obtains a terminal in the second group that has permission to communicate with the first terminal. The session management network element determines a terminal that is in an online state from the terminal that has permission to communicate with the first terminal.

In a possible design, that the session management network element obtains the terminal in the second group that has permission to communicate with the first terminal includes: The session management network element obtains, from a unified data management network element, indication information of the terminal in the second group that has permission to communicate with the first terminal.

In a possible design, the method further includes: The unified data management network element receives a first request message from an application function entity, where the first request message includes the indication information of the terminal in the second group that has permission to communicate with the first terminal.

According to a second aspect, a route configuration method is provided. The method includes: A first user plane network element receives first forwarding information sent by a session management network element, where the first forwarding information is used by the first user plane network element to forward a first packet, the first packet is a packet to be sent by a first terminal in a first group to a second terminal in a second group, and the first user plane network element is a user plane network element that provides a service for the first terminal. The first user plane network element stores the first forwarding information. Based on this technical solution, after the first user plane network element receives the first packet, the first user plane network element may forward the first packet based on the first forwarding information, so that a problem that terminals in two groups cannot communicate with each other in a conventional technology can be resolved.

In a possible design, when the first user plane network element and a second user plane network element are not a same user plane network element, the first forwarding information is specifically used by the first user plane network element to forward the first packet to the second user plane network element, and the second user plane network element is a user plane network element that provides a service for the second terminal.

In a possible design, when the first user plane network element and a second user plane network element are a same user plane network element, the first forwarding information is specifically used by the first user plane network element to forward the first packet to a second access network device, the second user plane network element is a user plane network element that provides a service for the second terminal, and the second access network device is an access network device that the second terminal accesses.

In a possible design, the first forwarding information is specifically used by the first user plane network element to forward the first packet to a first forwarding device, and the first forwarding device is responsible for forwarding a packet destined for a terminal in the second group.

According to a third aspect, a route configuration method is provided. The method includes: A second user plane network element receives second forwarding information sent by a session management network element, where the second forwarding information is used by the second user plane network element to forward a second packet, the second packet is a packet to be sent by a second terminal in a second group to a first terminal in a first group, and the second user plane network element is a user plane network element that provides a service for the second terminal. The second user plane network element stores the second forwarding information. Based on this technical solution, after the second user plane network element receives the second packet, the second user plane network element may forward the second packet based on the second forwarding information, so that a problem that terminals in two groups cannot communicate with each other in a conventional technology can be resolved.

In a possible design, when the first user plane network element and the second user plane network element are not a same user plane network element, the second forwarding information is specifically used by the second user plane network element to forward the second packet to the first user plane network element.

In a possible design, when the first user plane network element and a second user plane network element are a same user plane network element, the second forwarding information is specifically used by the second user plane network element to forward the second packet to a first access network device, and the first access network device is an access network device that the first terminal accesses.

In a possible design, the second forwarding information is specifically used by the second user plane network element to forward the second packet to a second forwarding device, and the second forwarding device is responsible for forwarding a packet destined for a terminal in the first group.

According to a fourth aspect, a route configuration method is provided. The method includes: A first forwarding device receives fourth forwarding information sent by a session management network element, where the fourth forwarding information is used by the first forwarding device to forward a first packet, and the first packet is a packet to be sent by a first terminal in a first group to a second terminal in a second group. The first forwarding device stores the fourth forwarding information. Based on this technical solution, after the first forwarding device receives the first packet, the first forwarding device may forward the first packet based on the fourth forwarding information, so that a problem that terminals in two groups cannot communicate with each other in a conventional technology can be resolved.

In addition, the first forwarding device stores the fourth forwarding information. Therefore, after a first terminal switches a user plane network element, the session management network element may configure only forwarding information between the user plane network element after switching and the first forwarding device, and does not need to configure other forwarding information. This helps simplify configuration complexity of the forwarding information.

In a possible design, when the first forwarding device is a device other than a second user plane network element, the fourth forwarding information is specifically used by the first forwarding device to forward the first packet to the second user plane network element.

According to a fifth aspect, a route configuration method is provided. The method includes: A second forwarding device receives third forwarding information sent by a session management network element, where the third forwarding information is used by the second forwarding device to forward a second packet, and the second packet is a packet to be sent by a second terminal in a second group to a first terminal in a first group. The second forwarding device stores the second packet. Based on this technical solution, after the second forwarding device receives the second packet, the second forwarding device may forward the second packet based on the third forwarding information, so that a problem that terminals in two groups cannot communicate with each other in a conventional technology can be resolved.

In addition, the second forwarding device stores the third forwarding information. Therefore, after a second terminal switches a user plane network element, the session management network element may configure only forwarding information between the user plane network element after switching and the second forwarding device, and does not need to configure other forwarding information. This helps simplify configuration complexity of the forwarding information.

In a possible design, when the second forwarding device is a device other than the first user plane network element, the third forwarding information is specifically used by the second forwarding device to forward the second packet to the first user plane network element.

According to a sixth aspect, a communication apparatus is provided. The communication apparatus includes: a processing unit, configured to determine that a first terminal in a first group is allowed to communicate with a second terminal in a second group; and a communication unit, configured to send first forwarding information to a first user plane network element, where the first user plane network element is a user plane network element that provides a service for the first terminal, the first forwarding information is used by the first user plane network element to forward a first packet, and the first packet is a packet to be sent by the first terminal to the second terminal.

In a possible design, when the first user plane network element and a second user plane network element are not a same user plane network element, the first forwarding information is specifically used by the first user plane network element to forward the first packet to the second user plane network element, and the second user plane network element is a user plane network element that provides a service for the second terminal.

In a possible design, when the first user plane network element and a second user plane network element are a same user plane network element, the first forwarding information is specifically used by the first user plane network element to forward the first packet to a second access network device, the second user plane network element is a user plane network element that provides a service for the second terminal, and the second access network device is an access network device that the second terminal accesses.

In a possible design, the first forwarding information is specifically used by the first user plane network element to forward the first packet to a first forwarding device, and the first forwarding device is responsible for forwarding a packet destined for a terminal in the second group.

In a possible design, the first forwarding device is one of user plane network elements that provide a service for one or more terminals in the second group, or the first forwarding device is a device other than a user plane network element that provides a service for one or more terminals in the second group.

In a possible design, the communication unit is further configured to send fourth forwarding information to the first forwarding device, where the fourth forwarding information is used by the first forwarding device to forward the first packet.

In a possible design, when the first forwarding device is a device other than a second user plane network element, the fourth forwarding information is specifically used by the first forwarding device to forward the first packet to the second user plane network element.

In a possible design, the communication unit is further configured to send second forwarding information to the second user plane network element, where the second forwarding information is used by the second user plane network element to forward a second packet, and the second packet is a packet to be sent by the second terminal to the first terminal.

In a possible design, when the first user plane network element and the second user plane network element are not a same user plane network element, the second forwarding information is specifically used by the second user plane network element to forward the second packet to the first user plane network element.

In a possible design, when the first user plane network element and a second user plane network element are a same user plane network element, the second forwarding information is specifically used by the second user plane network element to forward the second packet to a first access network device, and the first access network device is an access network device that the first terminal accesses.

In a possible design, the second forwarding information is specifically used by the second user plane network element to forward the second packet to a second forwarding device, and the second forwarding device is responsible for forwarding a packet destined for a terminal in the first group.

In a possible design, the second forwarding device is one of user plane network elements that provide a service for one or more terminals in the first group, or the second forwarding device is a device other than a user plane network element that provides a service for one or more terminals in the first group.

In a possible design, the communication unit is further configured to send third forwarding information to the second forwarding device, where the third forwarding information is used by the second forwarding device to forward the second packet.

In a possible design, when the second forwarding device is a device other than the first user plane network element, the third forwarding information is specifically used by the second forwarding device to forward the second packet to the first user plane network element.

In a possible design, the second terminal is a terminal in the second group that has permission to communicate with the first terminal and that is in an online state.

In a possible design, the communication unit is further configured to obtain a terminal in the second group that has permission to communicate with the first terminal. The processing unit is further configured to determine a terminal that is in an online state from the terminal that has permission to communicate with the first terminal.

In a possible design, the communication unit is specifically configured to obtain, from a unified data management network element, indication information of the terminal in the second group that has permission to communicate with the first terminal.

According to a seventh aspect, a communication apparatus is provided. The communication apparatus includes: a communication unit, configured to receive first forwarding information sent by a session management network element, where the first forwarding information is used by the first user plane network element to forward a first packet, the first packet is a packet to be sent by a first terminal in a first group to a second terminal in a second group, and the first user plane network element is a user plane network element that provides a service for the first terminal; and a processing unit, configured to store the first forwarding information.

In a possible design, when the first user plane network element and a second user plane network element are not a same user plane network element, the first forwarding information is specifically used by the first user plane network element to forward the first packet to the second user plane network element, and the second user plane network element is a user plane network element that provides a service for the second terminal.

In a possible design, when the first user plane network element and a second user plane network element are a same user plane network element, the first forwarding information is specifically used by the first user plane network element to forward the first packet to a second access network device, the second user plane network element is a user plane network element that provides a service for the second terminal, and the second access network device is an access network device that the second terminal accesses.

In a possible design, the first forwarding information is specifically used by the first user plane network element to forward the first packet to a first forwarding device, and the first forwarding device is responsible for forwarding a packet destined for a terminal in the second group.

According to an eighth aspect, a communication apparatus is provided. The communication apparatus includes: a communication unit, configured to receive second forwarding information sent by a session management network element, where the second forwarding information is used by the second user plane network element to forward a second packet, the second packet is a packet to be sent by a second terminal in a second group to a first terminal in a first group, and the second user plane network element is a user plane network element that provides a service for the second terminal; and a processing unit, configured to store the second forwarding information.

In a possible design, when the first user plane network element and the second user plane network element are not a same user plane network element, the second forwarding information is specifically used by the second user plane network element to forward the second packet to the first user plane network element.

In a possible design, when the first user plane network element and a second user plane network element are a same user plane network element, the second forwarding information is specifically used by the second user plane network element to forward the second packet to a first access network device, and the first access network device is an access network device that the first terminal accesses.

In a possible design, the second forwarding information is specifically used by the second user plane network element to forward the second packet to a second forwarding device, and the second forwarding device is responsible for forwarding a packet destined for a terminal in the first group.

According to a ninth aspect, a communication apparatus is provided. The communication apparatus includes: a communication unit, configured to receive fourth forwarding information sent by a session management network element, where the fourth forwarding information is used by the first forwarding device to forward a first packet, and the first packet is a packet to be sent by a first terminal in a first group to a second terminal in a second group; and a processing unit, configured to store the fourth forwarding information.

In a possible design, when the first forwarding device is a device other than a second user plane network element, the fourth forwarding information is specifically used by the first forwarding device to forward the first packet to the second user plane network element.

According to a tenth aspect, a communication apparatus is provided. The communication apparatus includes: a communication unit, configured to receive third forwarding information sent by a session management network element, where the third forwarding information is used by the second forwarding device to forward a second packet, and the second packet is a packet to be sent by a second terminal in a second group to a first terminal in a first group; and a processing unit, configured to store the second packet.

In a possible design, when the second forwarding device is a device other than the first user plane network element, the third forwarding information is specifically used by the second forwarding device to forward the second packet to the first user plane network element.

According to an eleventh aspect, a communication apparatus is provided. The communication apparatus includes a processor and a communication interface. The processor is configured to execute computer program instructions, to enable the communication apparatus to implement the route configuration method in any design provided in any one of the first aspect to the fifth aspect.

According to a twelfth aspect, a computer-readable storage medium is provided. The computer-readable storage medium stores instructions. When the instructions are run on a computer, the computer is enabled to implement the route configuration method in any design provided in any one of the first aspect to the fifth aspect.

According to a thirteenth aspect, a computer program product is provided. The computer program product includes instructions. When the computer program product is run on a computer, the computer is enabled to implement the route configuration method in any design provided in any one of the first aspect to the fifth aspect.

According to a fourteenth aspect, a chip is provided. The chip includes a processor. When the processor executes computer program instructions, a computer is enabled to implement the route configuration method in any design provided in any one of the first aspect to the fifth aspect.

According to a fifteenth aspect, a communication system is provided. The communication system includes a first user plane network element and a session management network element. The first user plane network element provides a service for a first terminal and a second terminal, where the first terminal belongs to a first group, and the second terminal belongs to a second group. The session management network element is configured to: determine that the first terminal is allowed to communicate with the second terminal; and send first forwarding information to the first user plane network element, where the first forwarding information is used by the first user plane network element to forward a first packet to a second access network device, the first packet is a packet to be sent by the first terminal to the second terminal, and the second access network device is an access network device that the second terminal accesses. The first user plane network element is configured to: receive the first forwarding information, and store the first forwarding information.

In a possible design, the session management network element is further configured to send second forwarding information to the first user plane network element, where the second forwarding information is used by the first user plane network element to forward a second packet to a first access network device, the second packet is a packet to be sent by the second terminal to the first terminal, and the first access network device is an access network device that the first terminal accesses. The first user plane network element is further configured to: receive the second forwarding information, and store the second forwarding information.

In a possible design, the communication system further includes a second user plane network element, and the second user plane network element provides a service for a third terminal in the second group. The session management network element is configured to: determine that the first terminal is allowed to communicate with the third terminal; and send third forwarding information to the first user plane network element, where the third forwarding information is used by the first user plane network element to forward a third packet to the second user plane network element, and the third packet is a packet to be sent by the first terminal to the third terminal. The first user plane network element is further configured to: receive the third forwarding information, and store the third forwarding information.

In a possible design, the session management network element is configured to send fourth forwarding information to the second user plane network element, where the fourth forwarding information is used by the second user plane network element to forward a fourth packet to the first user plane network element, and the fourth packet is a packet to be sent by the third terminal to the first terminal. The second user plane network element is configured to: receive the fourth forwarding information, and store the fourth forwarding information.

In a possible design, the communication system further includes a second user plane network element and a first forwarding device, the second user plane network element provides a service for a third terminal in the second group, and the first forwarding device is responsible for forwarding a packet destined for a terminal in the second group. The session management network element is further configured to: send third forwarding information to the first user plane network element, and send fifth forwarding information to the first forwarding device. The third forwarding information is used by the first user plane network element to forward a third packet to the first forwarding device, and the third packet is a packet to be sent by the first terminal to the third terminal. The fifth forwarding information is used by the first forwarding device to forward the third packet to the second user plane network element. The first user plane network element is further configured to: receive the third forwarding information, and store the third forwarding information. The first forwarding device is configured to: receive the fifth forwarding information, and store the fifth forwarding information.

In a possible design, the communication system further includes a second forwarding device, and the second forwarding device is responsible for forwarding the packet destined for a terminal in the second group. The session management network element is further configured to: send fourth forwarding information to the second user plane network element, and send sixth forwarding information to the second forwarding device. The fourth forwarding information is used by the second user plane network element to forward a fourth packet to the second forwarding device, and the fourth packet is a packet to be sent by the third terminal to the first terminal. The sixth forwarding information is used by the second forwarding device to forward the fourth packet to the first user plane network element. The second user plane network element is configured to: receive the fourth forwarding information, and store the fourth forwarding information. The second forwarding device is configured to: receive the sixth forwarding information, and store the sixth forwarding information.

In a possible design, the communication system further includes a unified data management network element. The unified data management network element is further configured to send, to the session management network element, indication information of a terminal in the second group that has permission to communicate with the first terminal. The session management network element is further configured to receive the indication information of the terminal in the second group that has permission to communicate with the first terminal.

In a possible design, the communication system further includes an application function entity. The application function entity is configured to send a first request message, where the first request message includes the indication information of the terminal in the second group that has permission to communicate with the first terminal. The unified data management network element is further configured to receive the first request message.

In a possible design, the communication system further includes an exposure function network element. The application function entity is specifically configured to send the first request message to the exposure function network element. The exposure function network element is configured to: receive the first request message sent by the application function entity; and send the first request message to the unified data management network element. The unified data management network element is configured to receive the first request message that is sent by the exposure function network element.

Names of the foregoing forwarding information (for example, the first forwarding information to the sixth forwarding information) are merely examples, and may alternatively have other names. This is not specifically limited herein. Words such as "first" and "second" do not limit specific content or functions of the forwarding information.

To be specific, “first” forwarding information and “second” forwarding information are not definitely different or same. This is not limited.

For technical effects brought by any design manner in the fifth aspect to the fifteenth aspect, refer to the beneficial effects in the corresponding method and the technical effects brought by the corresponding design manner provided above. Details are not described herein again.

DESCRIPTION OF EMBODIMENTS

Figure 1:
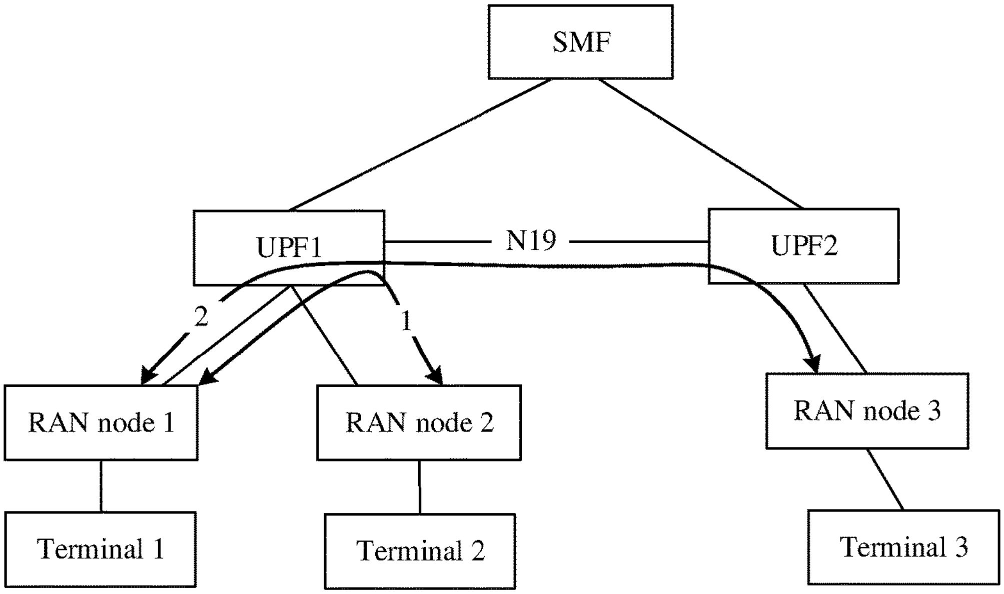
FIG. 1 is a schematic diagram of a system architecture of a 5GVN.

In descriptions of this application, unless otherwise specified, “I” means “or”. For example, AB may represent A or B. A term “and/or” in this specification describes only an association relationship between associated objects and indicates that there may be three relationships. For example, A and/or B may represent the following three cases: Only A exists, both A and B exist, and only B exists. In addition, “at least one” means one or more, and “a plurality of” means two or more. Terms such as “first” and “second” do not limit a quantity and an execution sequence, and the terms such as “first” and “second” do not indicate a definite difference.

It should be noted that in this application, terms such as “example” and “for example” are used to represent giving an example, an illustration, or descriptions. Any embodiment or design scheme described as an “example” or “for example” in this application should not be explained as being more preferable or having more advantages than another embodiment or design scheme. Exactly, use of the word “example”, “for example”, or the like is intended to present a related concept in a specific manner.

In embodiments of this application, a data packet and a packet have a same meaning, and are interchangeable. This is uniformly described herein, and details are not described below again.

To facilitate understanding of the technical solutions in this application, the following first briefly describes technical terms in this application.

1. PDU Session

A 5G core network supports a PDU connectivity service. The PDU connectivity service is a service of exchanging PDU data packets between a terminal and a data network (data network, DN). The PDU connectivity service is implemented by initiating establishment of a PDU session by the terminal. The terminal establishes a PDU session, that is, establishes a data transmission channel between the terminal and the DN.

It should be noted that the terminal may initiate establishment of one or more PDU sessions to connect to a same DN or different DNs. The terminal may initiate establishment of PDU sessions based on a group of core network elements (such as a session management function (session management function, SMF) network element, a policy control function (policy control function, PCF) network element, and a user plane function (user plane function, UPF) network element).

Each PDU session supports one PDU session type. For example, the PDU session type may be IPv4, IPv6, Ethernet (ethernet), or the like.

2. N4 Session

An N4 session is created by an SMF on a UPF, to manage a function of a UPF that provides a service for a PDU session. For example, when a terminal establishes a PDU session, the SMF may indicate the UPF to establish an N4 session corresponding to the PDU session. When the SMF receives a request for deleting the PDU session, the SMF triggers the UPF to delete the N4 session corresponding to the PDU session. In some cases, the SMF may further trigger the UPF to modify the N4 session corresponding to the PDU session.

In embodiments of this application, N4 sessions may be classified into user-level (or terminal-level) N4 sessions and group-level N4 sessions.

In an establishment process of an N4 session, both the SMF and the UPF generate an N4 session context to store parameters related to the N4 session. The N4 session context may include an N4 session ID, and N4 routing rules used for the N4 session, including a packet detection rule (packet detection rule, PDR), a forwarding action rule (forwarding action rule, FAR), a quality of service (quality of services, QoS) enforcement rule (QoS enforcement rule, QER), and a usage reporting rule (usage reporting rule, URR).

The UPF implements forwarding of a PDU session packet based on the parameters in the N4 session context such as the PDR, the FAR, the QER, and the URR.

For example, after receiving a packet from an ingress, the UPF determines an N4 session to which the packet belongs. Then, the UPF performs matching between a PDR (which may be one or more PDRs) in the N4 session context and characteristic information of the packet, to find a PDR that matches the packet. The PDR associates or specifies a FAR, a QER, and a URR that correspond to the packet. Therefore, the UPF may perform the following operation on the packet according to the FAR: dropping (drop), forwarding (forward), buffering (buffer), notifying (notify) a control plane, or duplicating (duplicate). The UPF may perform a QoS enforcement on the packet according to the QER. The UPF may perform usage reporting on the packet according to the URR.

3. Tunnel

In embodiments of this application, tunnels may be classified into the following two types: (1) A tunnel between an access network device and a UPF. The tunnel between an access network device and a UPF may have another name, for example, a next generation (next generation, N) 3 interface (N3 for short) tunnel. (2) A tunnel between two UPFs. A tunnel between two UPFs may have another name, for example, an N19 tunnel.

It should be noted that the tunnel may be a tunnel at a session granularity, a tunnel at a device granularity, or a tunnel at a group granularity.

The tunnel at a session granularity is a tunnel used only for one PDU session. The tunnel at a session granularity is used for transmission of only a data packet of a corresponding PDU session.

The tunnel at a device granularity is a tunnel established between two devices (for example, a RAN node and a UPF), and the tunnel is used for transmission of data of all terminals served by the two devices.

The tunnel at a group granularity is a tunnel used by all terminals in one group. The tunnel at a group granularity is used for transmission of only a data packet of a terminal in a corresponding group.

4. UPF Internal Interface

A UPF internal interface is a virtual port or a specific port in a UPF, and is used by the UPF to locally forward data packets received from a core network side or an access network side.

In embodiments of this application, the UPF locally forwards the data packet via the internal interface, and the UPF re-receives the data packet on the internal interface and re-detects the data packet, to match a corresponding routing rule, so as to forward the data packet to a correct path.

5. Online State and Offline State

In embodiments of this application, that a terminal in a group is in an online state means that the terminal has established a PDU session to access a 5GVN service, or a PDU session that is established by the terminal to access a 5GVN service is in an active state. Correspondingly, that a terminal in a group is in an offline state means that the terminal has not established a PDU session to access a 5GVN service, or a PDU session that is established by the terminal to access a 5GVN service is in an inactive state.

For ease of description, in the following, “a terminal in an online state” may be referred to as “an online terminal”, and “a terminal in an offline state” may be referred to as “an offline terminal” or “a terminal not online”.

6. External Group Identifier (External Group ID) and Internal Group Identifier (Internal Group ID)

An external group identifier is an identifier for identifying a group by an application server, an operating system, an operating system, or the like outside a 3GPP network. After a terminal dynamically creates a group at an application layer, the application server allocates a dynamic group identifier to the application layer group. A group identifier allocated by the application server may be referred to as an external group identifier. In embodiments of this application, a DNN+S-NSSAI identifier may be used as an external group identifier, or may be used as an internal group identifier.

In the 3GPP network, a network device generally cannot directly identify the external group identifier, and thus cannot understand a meaning of the identifier. As a result, different groups cannot be distinguished, and therefore, corresponding groups cannot be managed and subsequent LAN services (LAN type services) cannot be provided. To enable the 3GPP network to identify different groups, an AF may send a group request to a 3GPP network element. In this way, the 3GPP network element may generate an internal group identifier of a group based on the group request. Generally, an NEF may complete mapping between the external group identifier and the internal group identifier. The internal group identifier is a group identifier that can be identified by a 3GPP core network element. In this way, the 3GPP network element may perform group management and the like based on the internal group identifier. For example, the group management may be adding a group member to the group or deleting a group member from the group.

The foregoing describes the technical terms in this application. Details are not described below again.

For a 5GVN service, the third generation partnership project (3rd generation partnership project, 3GPP) technical rule (technical rule, TR) 23.734 proposes to support one-to-one communication and one-to-many communication in a 5GVN. Specifically, to support one-to-one communication and one-to-many communication in the 5GVN, a 3GPP network is required to support group-based unicast, multicast, and broadcast, support duplication and distribution of multicast and broadcast packets, and support any terminal as a multicast source.

To meet this requirement, the current 3GPP technical standard (technical standard, TS) 23.501 defines that one 5GVN is managed by one SMF. As shown in FIG. 1, the SMF manages one or more UPFs. FIG. 1 is drawn by using an example in which the SMF manages UPF1 and UPF2. UPF1 and UPF2 maintain routing rules. UPF1 and UPF2 may perform packet forwarding according to the routing rules maintained by UPF1 and UPF2. It is assumed that a terminal 1, a terminal 2, and a terminal 3 belong to a same group. When two terminals (for example, the terminal 1 and the terminal 2 in FIG. 1) served by a same UPF perform one-to-one communication with each other, data transmission is performed by the UPF through local switching (local switch). When two terminals (for example, the terminal 1 and the terminal 3 in FIG. 1) served by different UPFs perform one-to-one communication with each other, data transmission is performed through a tunnel between UPF1 and UPF2.

In embodiments of this application, two UPFs may exchange tunnel information through the SMF, to establish the tunnel. A tunnel (or a forwarding path) corresponding to tunnel information of a UPF network element may be constructed using a virtual local area network (virtual LAN, VLAN), a virtual extensible local area network (virtual extensible LAN, VxLAN), a general packet radio service (general packet radio service, GPRS) tunneling protocol-user plane (GPRS tunneling protocol-user plane, GTP-U), a generic routing encapsulation (generic routing encapsulation, GRE) protocol, or an IP tunnel. The foregoing construction may be dynamic, or may be pre-configured in a network. This is not specifically limited in embodiments of this application.

Different construction manners correspond to different tunnel information. For example, when the VLAN is used for construction, the tunnel information may be a UPF ID, a UPF ID+a virtual local area network identifier (VLAN ID, VID), or media access control (media access control, MAC)+a VID. Alternatively, for example, when the VxLAN is used for construction, the tunnel information may be a UPF ID, a UPF ID+a VID, an IP address+a VID, or an IP address+a port (port) number+a VID. Alternatively, for example, when the GTP-U is used for construction, the tunnel information may be a UPF ID, a UPF ID+a tunnel endpoint identifier (tunnel endpoint identifier, TED), an IP address+a TED, or an IP address+a port+a TEID. Alternatively, for example, when the GRE is used for construction, the tunnel information may be a UPF ID, a UPF ID+a key (key), an IP address+a key, or an IP address+a port+a key. Alternatively, when the IP tunnel is used for construction, the tunnel information may be a UPF ID, an IP address, or an IP address+a port. If the tunnel information includes the UPF ID, the UPF ID may be a MAC address or an IP address, or an IP address+a port. Alternatively, an SMF network element or the UPF network element may determine, based on the UPF ID, a corresponding MAC address or IP address, or an IP address+a port. General descriptions are provided herein. Details are not described below again.

In embodiments of this application, one 5GVN may provide a group communication service for one or more groups. In other words, one 5GVN may correspond to one or more groups. One SMF or UPF may alternatively provide a communication service for a plurality of groups.

Optionally, the 5G VN may also be referred to as a 5G VN group, a 5G local area network (5G local area network, 5GLAN), a 5GLAN group (group), a local area network (local area network, LAN), a 5G LAN-VN LAN group, a LAN-type service (type service), a LAN-VN, a 5G LAN-type service (type service), or the like. A name of the 5G VN is not specifically limited in embodiments of this application.

In embodiments of this application, a routing rule may be equivalent to forwarding information, and may include one or more of parameters such as the PDR, the FAR, the QER, and the URR. The routing rule and the forwarding information are interchangeable in the entire text.

In embodiments of this application, a packet is equivalent to a data packet, and the packet and the data packet are interchangeable in this specification.

In the architecture shown in FIG. 1, the SMF is mainly responsible for all control plane functions of terminal session management, including UPF selection and control, IP address allocation and management, session quality of service (quality of service, QoS) management, a function of obtaining a policy and charging control (policy and charging control, PCC) policy from a PCF, and the like.

In the architecture shown in FIG. 1, the UPF serves as an anchor point of a PDU session connection, and is responsible for data packet filtering of a terminal, data transmission/forwarding, rate control, charging information generation, user plane QoS processing, uplink transmission authentication, transmission class verification, downlink data packet buffering, downlink data notification triggering, and the like.

In the architecture shown in FIG. 1, a radio access network (radio access network, RAN) is a RAN node, and the RAN node may also be referred to as an access network device. For example, the RAN node may be a transmission reception point (transmission reception point, TRP), a base station, or a control node in various forms (for example, a network controller or a radio controller (for example, a radio controller in a cloud radio access network (cloud radio access network, CRAN) scenario)). Specifically, the RAN node may be a macro base station, a micro base station (also referred to as a small cell), a relay station, an access point (access point, AP), or the like in various forms, or may be an antenna panel of a base station. The control node may be connected to a plurality of base stations, and configure resources for a plurality of terminals within coverage of the plurality of base stations. In systems using different radio access technologies, names of devices having functions of a base station may vary. For example, the device may be referred to as an evolved NodeB (evolved NodeB, eNB or eNodeB) in a long term evolution (long term evolution, LTE) system, or may be referred to as a next generation NodeB (next generation node base station, gNB) in a 5G system or an NR system. A specific name of the base station is not limited in this application. The RAN node may alternatively be a network device in a future evolved public land mobile network (public land mobile network, PLMN) or the like.

In the architecture shown in FIG. 1, the terminal is an entity for receiving a signal and/or sending a signal on a user side. The terminal is configured to provide users with one or more of a voice service and a data connectivity service. The terminal may also be referred to as user equipment (user equipment, UE), a terminal device, an access terminal, a subscriber unit, a subscriber station, a mobile station, a remote station, a remote terminal, a mobile device, a user terminal, a wireless communication device, a user agent, or a user apparatus. The terminal may be a vehicle to everything (vehicle to everything, V2X) device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or Battery EV), a hybrid electric vehicle (hybrid electric vehicle, HEV), a range extended electric vehicle (range extended EV, REEV), a plug-in hybrid electric vehicle (plug-in HEV, PHEV), a new energy vehicle (new energy vehicle), or a road side unit (road site unit, RSU). Alternatively, the terminal may be a device-to-device (device-to-device, D2D) device, for example, an electricity meter or a water meter. Alternatively, the terminal may be a mobile station (mobile station, MS), a subscriber unit (subscriber unit), an uncrewed aerial vehicle, an internet of things (internet of things, IoT) device, a station (station, ST) in a WLAN, a cellular phone (cellular phone), a smartphone (smartphone), a cordless telephone set, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device, another processing device connected to a wireless modem, a vehicle-mounted device, or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

Figure 2:
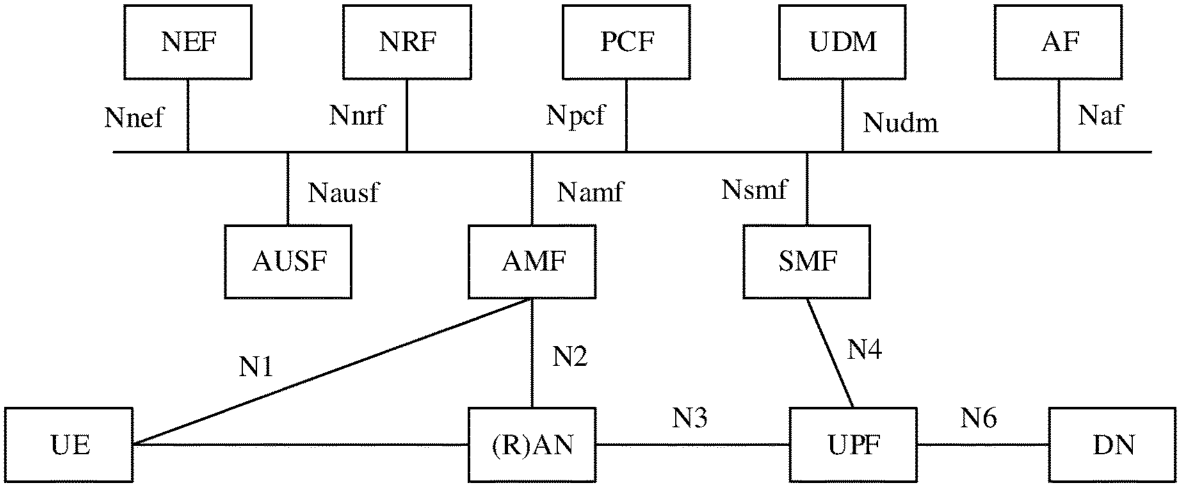
FIG. 2 is a schematic diagram of an architecture of a 5G network according to an embodiment of this application.

Optionally, as shown in FIG. 2, a current 5G network may further include the following network elements: an access and mobility management function (core access and mobility management function, AMF) network element, an authentication server function (authentication server function, AUSF) network element, a network slice selection function (network slice selection function, NSSF) network element, a network exposure function (network exposure function, NEF) network element, a network repository function (network exposure function Repository Function, NRF) network element, a policy control function (policy control function, PCF) network element, a unified data management (unified data management, UDM) network element, an application function (application function, AF) network element, and the like. This is not specifically limited in embodiments of this application.

A terminal communicates with the AMF network element via a next generation (Next generation, N) network 1 interface (N1 for short). A RAN device communicates with the AMF network element via an N2 interface (N2 for short). The RAN device communicates with a UPF network element via an N3 interface (N3 for short). The UPF network element communicates with a DN via an N6 interface (N6 for short).

Control plane network elements, for example, the AMF network element, the SMF network element, the UDM network element, the AUSF network element, and the PCF network element, may alternatively interact with each other via a service-based interface. For example, as shown in FIG. 2, a service-based interface exhibited by the AMF may be Namf, a service-based interface exhibited by the SMF network element may be Nsmf, a service-based interface exhibited by the UDM network element may be Nudm, a service-based interface exhibited by the PCF network element may be Npcf, and a service-based interface exhibited by the AUSF network element may be Nausf. Details are not described herein.

A session management network element in the following may be an SMF in a 5G core network, or may be a network element responsible for session management in another network. A user plane network element may be a UPF in a 5G core network, or may be a network element responsible for a user plane in another network. This is uniformly described herein, and details are not described below again.

Figure 3:
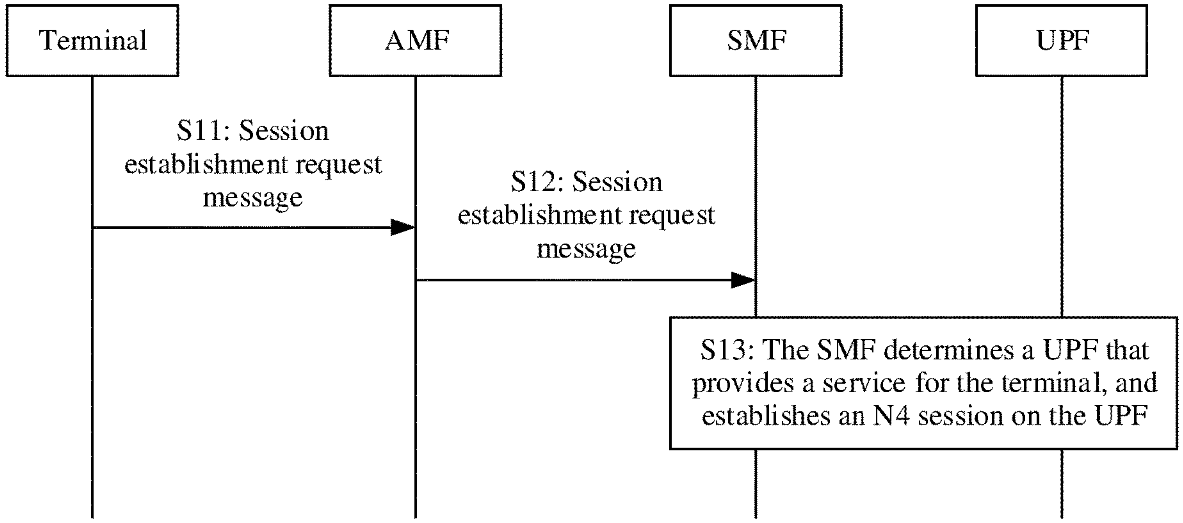
FIG. 3 is a schematic flowchart in which a terminal establishes a session to access a 5GVN service.

FIG. 3 shows a procedure in which a terminal establishes a PDU session to access a 5GVN service. The procedure includes the following steps.

S11: A terminal sends a session establishment request message to an AMF, and accordingly the AMF receives the session establishment request message sent by the terminal.

The session establishment request message is used to request to establish a PDU session. The session establishment request includes an identifier of the terminal and a group identifier.

In this embodiment of this application, the identifier of the terminal in the session establishment request message may include one or more of the following: a subscription permanent identifier (subscription permanent identifier, SUPI), a generic public subscription identifier (generic public subscription identifier, GPSI), an international mobile subscriber identity (international mobile subscriber identification number, a mobile subscriber integrated services digital network (mobile station integrated services digital network number, MSISDN), a globally unique temporary identity (global unique temporary identifier, GUTI), a data network-related identifier (for example, a network access identifier (network access identifier, NAI), a specific user identifier of a local area network, an internet protocol version 4 (internet protocol version 4, IPv4) address, an internet protocol version 6 (internet protocol version 6, IPv6) address, a MAC address, a MAC address+a VID), or the like.

In this embodiment of this application, the group identifier is used to determine a corresponding 5GVN group. The group identifier may be a data network name (data network name, DNN), a group identifier (Group ID), a DNN+single network slice selection assistance information (single network slice selection assistance information, S-NSSAI) identifier, or the like.

S12: The AMF sends the session establishment request message to an SMF, and accordingly the SMF receives the session establishment request message sent by the AMF.

S13: The SMF determines a UPF that provides a service for the terminal, and establishes an N4 session on the UPF.

In this way, the N4 session established by the UPF stores a corresponding N4 routing rule, so that the UPF may forward a packet of a group according to the N4 routing rule.

Figure 4:
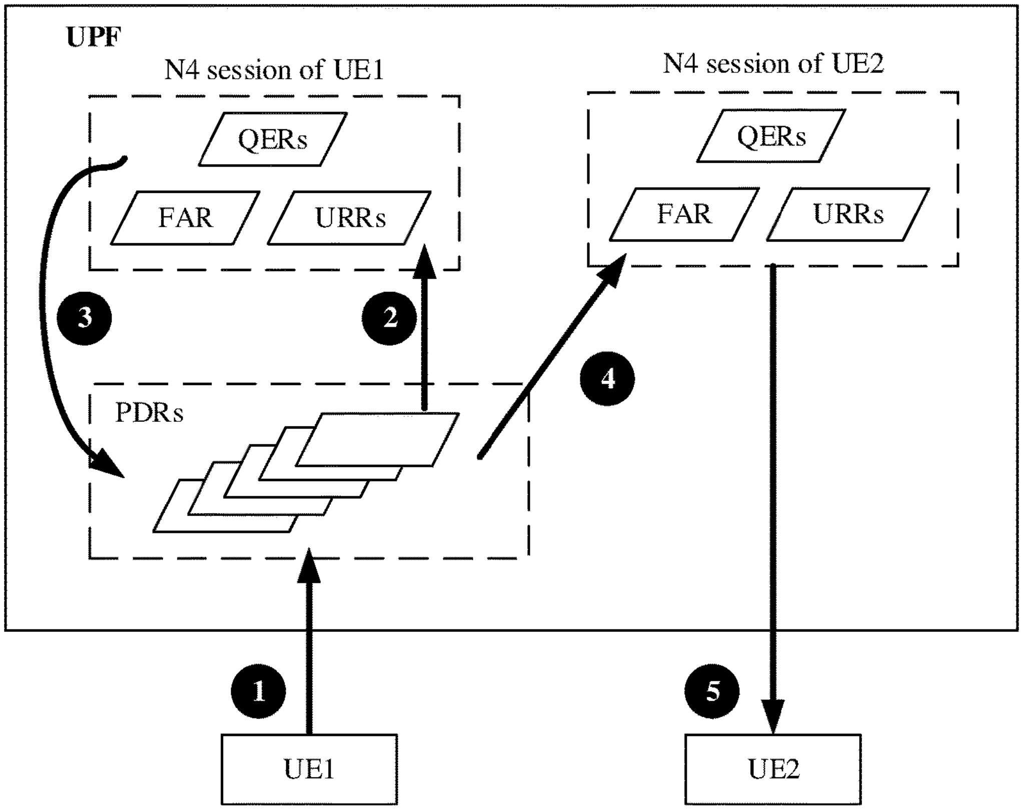
FIG. 4 is a flowchart of local switching transmission performed by a UPF in a conventional technology.

FIG. 4 is a procedure in which a packet sent by UE1 to UE2 in a same group is transmitted through local switch in a conventional technology. The procedure specifically includes the following steps.

1. A UPF receives, through an uplink tunnel of a session corresponding to UE1, a data packet sent by UE1 to UE2.
2. The UPF finds, in an N4 session corresponding to UE1, a PDR matching the data packet. A destination interface parameter of a FAR associated with the PDR that is found by the UPF for the first time is set to a value of an internal interface (for example, "5GVN internal"), and a network instance is set to an identifier of a group to which UE1 belongs.
3. The UPF sends, to the internal interface according to the FAR associated with the PDR that is found for the first time, the data packet whose external GTP-U header is removed.
4. The UPF matches, based on a destination address of the data packet (an address of UE2) and a source interface of "5GVN internal", a corresponding PDR and identifies an N4 session corresponding to UE2. A destination interface parameter of a FAR associated with a PDR that is found by the UPF for the second time is set to tunnel information of an access network device connected to UE2.
5. The UPF adds an external header to the data packet according to the FAR associated with the PDR that is found by the UPF for the second time, and sends, through a corresponding downlink tunnel, the data packet to a RAN accessed by UE2. The RAN sends the data packet to UE2.

Figure 5:
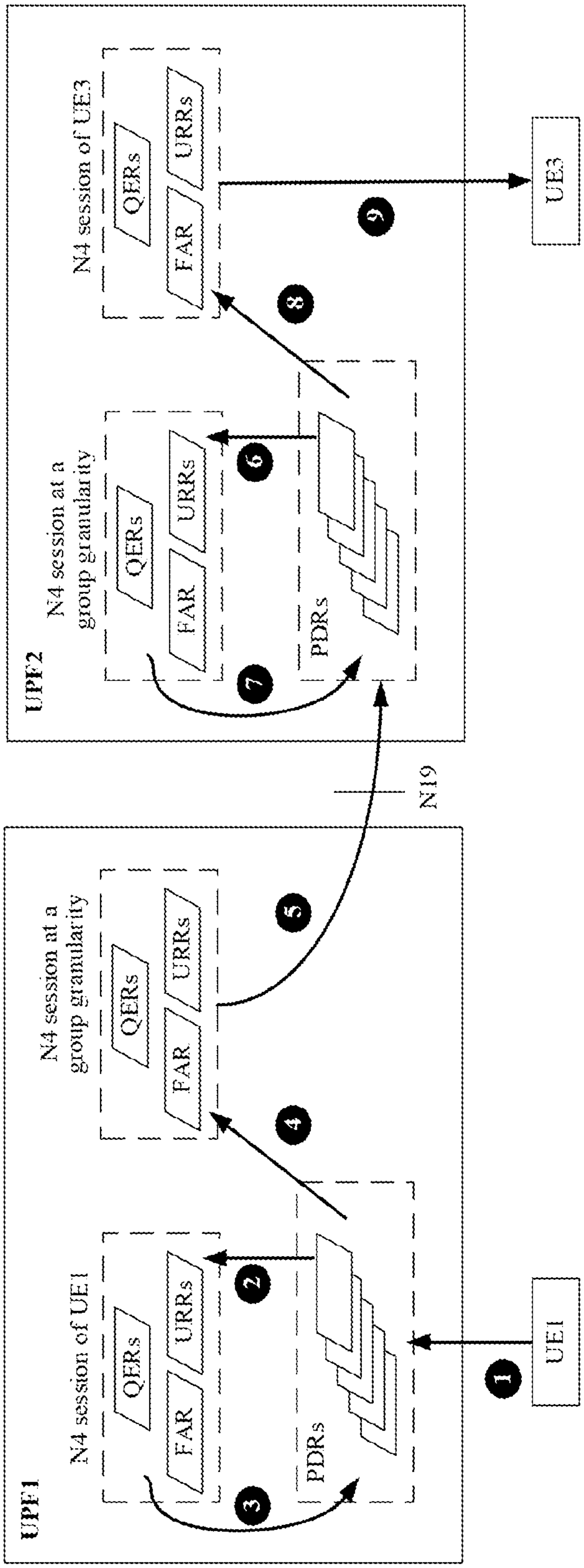
FIG. 5 is a flowchart of cross-UPF transmission in a conventional technology.

FIG. 5 is a flowchart of cross-UPF transmission of a packet sent by UE1 to UE3 in a conventional technology, where UE1 and UE3 are in a same group. The procedure specifically includes the following steps.

1. UPF1 receives, through an uplink tunnel of a session corresponding to UE1, a data packet sent by UE1 to UE2.
2. UPF1 finds, in an N4 session corresponding to UE1, a PDR matching the data packet. A destination interface parameter of a FAR associated with the PDR that is found by UPF1 for the first time is set to "5GVN internal", and a network instance is set to an identifier of a group to which UE1 belongs.
3. UPF1 sends, to the internal interface according to the FAR associated with the PDR that is found for the first time, the data packet whose external header is removed.
4. UPF1 matches, based on a destination address of the data packet (an address of UE3) and a source interface of "5GVN internal", a corresponding PDR and identifies an N4 session at a group granularity. A destination interface parameter of a FAR associated with a PDR that is found by UPF1 for the second time is set to N19 tunnel information of UPF2.
5. UPF1 encapsulates the N19 tunnel information of UPF2 into the data packet according to the FAR associated with the PDR that is found for the second time, and sends the data packet to UPF2.

6. After receiving the data packet through the N19 tunnel, UPF2 matches a corresponding PDR based on a header and/or a network instance that carry/carries the N19 tunnel information, to identify an N4 session at a group granularity. A destination interface parameter of a FAR associated with the PDR that is found by UPF2 for the first time is set to "5GVN internal", and a network instance is set to an identifier of a group to which UE3 belongs.
7. UPF2 removes the external packet header of the data packet according to the FAR associated with the PDR that is found for the first time, and sends the data packet to an internal interface.
8. UPF2 matches, based on the destination address of the data packet (that is, the address of UE3) and the source interface of "5GVN internal", a corresponding PDR and identifies an N4 session corresponding to UE3. A destination interface parameter of a FAR associated with a PDR that is found by UPF2 for the second time is set to tunnel information of an access network device connected to UE3.
9. UPF2 adds an external header to the data packet according to the FAR associated with the PDR that is found by the UPF for the second time, and sends, through a corresponding downlink tunnel, the data packet to a RAN accessed by UE3. The RAN sends the data packet to UE3.

In the conventional technology, an N4 routing rule stored on a UPF can support only communication between different terminals in a same group, but cannot support communication between a terminal in a group and a terminal in another group.

For ease of description, the "communication between a terminal in a group and a terminal in another group" is referred to as "cross-group communication" in the following for short. General descriptions are provided herein, and details are not described in the following again.

In embodiments of this application, cross-group communication may be classified into two types: unidirectional cross-group communication and bidirectional cross-group communication.

The unidirectional cross-group communication means that a packet may be transmitted only in one direction between two terminals belonging to different groups. For example, a terminal 1 in a group 1 may send a packet to a terminal 2 in a group 2, but the terminal 2 in the group 2 cannot send a packet to the terminal 1 in the group 1.

The bidirectional cross-group communication means that two terminals belonging to different groups may transmit packets to each other. For example, a terminal 1 in a group 1 may send a packet to a terminal 2 in a group 2, and the terminal 2 in the group 2 may also send a packet to the terminal 1 in the group 1.

To support cross-group communication, two system architectures for cross-group communication are provided in embodiments of this application.

System architecture 1 for cross-group communication: When a first terminal in a first group is allowed to communicate with a second terminal in a second group, if a first user plane network element and a second user plane network element are not a same user plane network element, a tunnel for transmitting a packet between the first terminal and the second terminal is established between the first user plane network element and the second user plane network element. If the first user plane network element and the second user plane network element are a same user plane network element, the first user plane network element transmits a packet between the first terminal and the second terminal through local switch. The first user plane network element is a user plane network element that provides a service for the first terminal. The second user plane network element is a user plane network element that provides a service for the second terminal.

Figure 6:
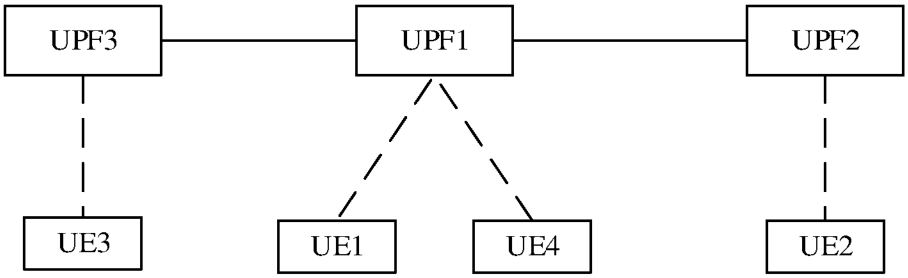
FIG. 6 is a schematic diagram of a system architecture 1 for cross-group communication according to an embodiment of this application.

FIG. 6 is used as an example for description. UE1 and UE2 belong to a first group, and UE3 and UE4 belong to a second group. UE1 may communicate with UE3 and UE4. A user plane network element that provides a service for UE1 is UPF1. A user plane network element that provides a service for UE2 is UPF2. A user plane network element that provides a service for UE3 is UPF3. A user plane network element that provides a service for UE4 is UPF1. To support communication between UE1 and UE4, UPF1 is configured with forwarding information that supports a packet between UE1 and UE4 for local switch. To support communication between UE1 and UE3, an N19 tunnel for transmitting a packet between UE1 and UE3 is established between UPF1 and UPF3. It should be noted that, to simplify the accompanying drawing, FIG. 6 does not show a RAN node between a UPF and UE.

System architecture 2 for cross-group communication: When a first terminal in a first group may send a packet to a second terminal in a second group, a tunnel is established between a first user plane network element and a first forwarding device, and a tunnel is established between a second user plane network element and the first forwarding device, so that the first forwarding device may be responsible for forwarding a packet to be sent by the first terminal to the second terminal; and/or when a second terminal in a second group may send a packet to a first terminal in a first group, a tunnel is established between a first user plane network element and a second forwarding device, and a tunnel is established between a second user plane network element and the second forwarding device, so that the second forwarding device may be responsible for forwarding a packet to be sent by the second terminal to the first terminal.

Figure 7:
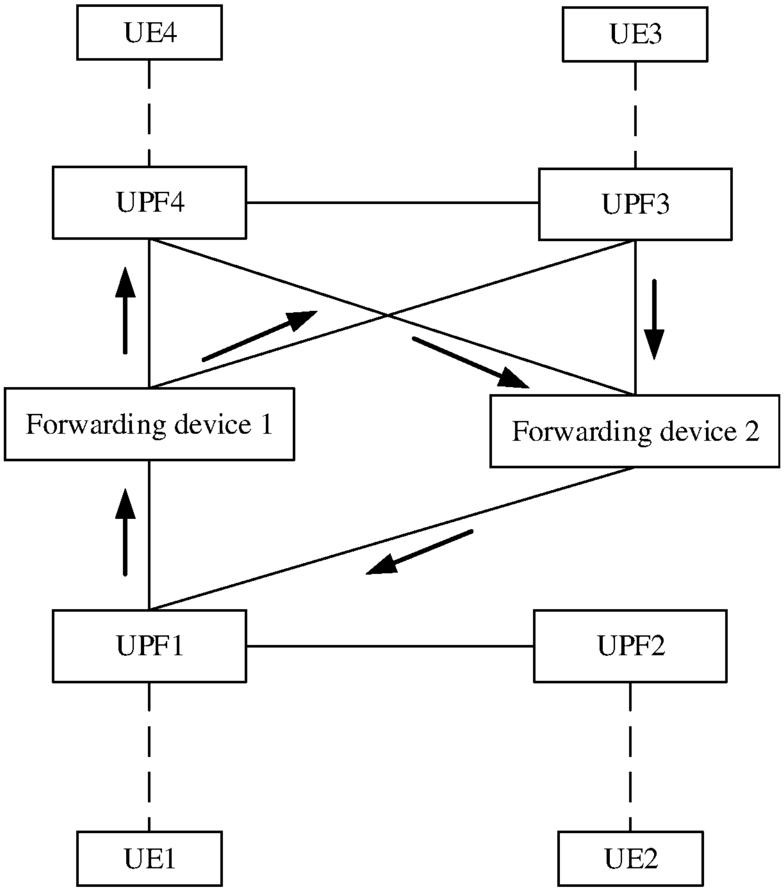
FIG. 7 is a schematic diagram of a system architecture 2 for cross-group communication according to an embodiment of this application.

FIG. 7 is used as an example for description. UE1 and UE2 belong to a first group, and UE3 and UE4 belong to a second group. UE1 may perform bidirectional communication with UE3 and UE4. A user plane network element that provides a service for UE1 is UPF1. A user plane network element that provides a service for UE2 is UPF2. A user plane network element that provides a service for UE3 is UPF3. A user plane network element that provides a service for UE4 is UPF4. A forwarding device 1 separately establishes tunnels with UPF1, UPF3, and UPF4, and the forwarding device 1 may forward a packet to be sent by UE1 to UE3 or UE4. A forwarding device 2 separately establishes tunnels with UPF1, UPF3, and UPF4, and the forwarding device 2 may forward a packet to be sent by UE3 or UE4 to UE1. It should be noted that, to simplify the accompanying drawing, FIG. 7 does not show a RAN node between a UPF and UE.

Optionally, when the cross-group communication supports bidirectional communication, the first forwarding device and the second forwarding device may be a same device.

In comparison with the system architecture 2 for cross-group communication, the system architecture 1 for cross-group communication has the following advantages: A packet for cross-group communication does not need to be forwarded via a forwarding device. Therefore, a forwarding path of the packet is short, which helps reduce a packet forwarding latency.

In comparison with the system architecture 1 for cross-group communication, the system architecture 2 for cross-group communication has the following advantage: When a terminal switches a UPF, only forwarding information of the terminal needs to be synchronized to a forwarding device. Therefore, complexity of configuring the forwarding information is reduced.

Based on the system architecture 1 for cross-group communication, the following specifically describes a route configuration method provided in an embodiment of this application.

Figure 8:
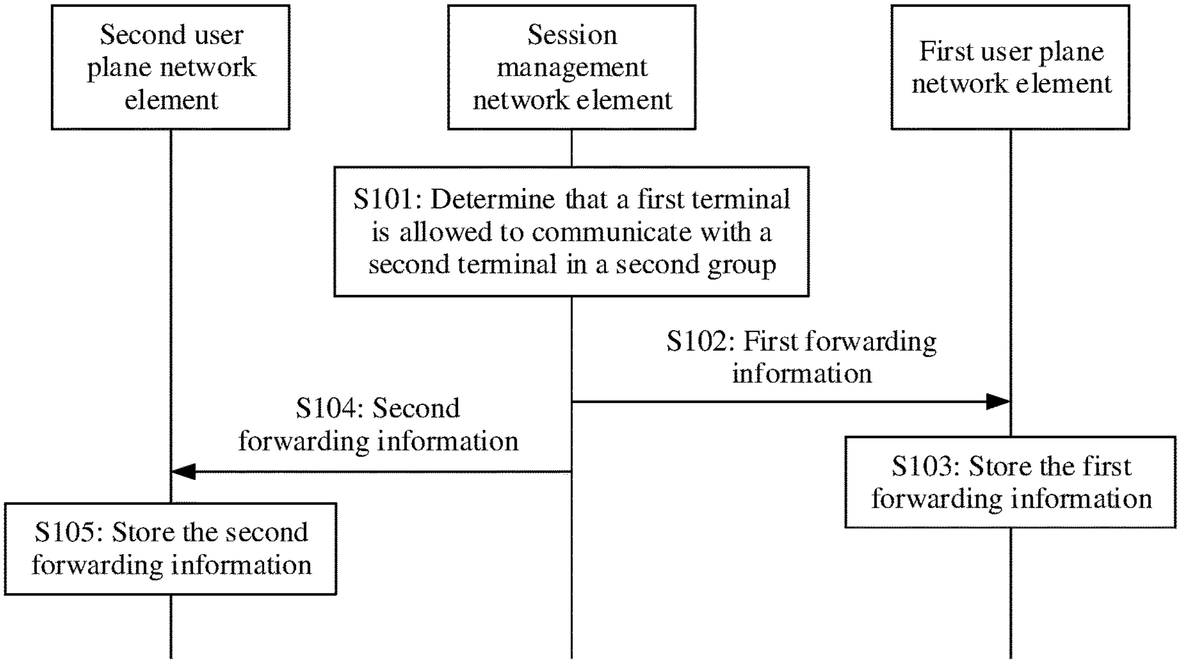
FIG. 8 is a flowchart of a route configuration method according to an embodiment of this application.

As shown in FIG. 8, the route configuration method includes the following steps.

S101: A session management network element determines that a first terminal in a first group is allowed to communicate with a second terminal in a second group.

The first group and the second group are different groups. The first terminal is any terminal in the first group.

In this embodiment of this application, the second terminal is a terminal that meets preset conditions and that is in the second group. The preset conditions include Condition 1 and Condition 2, where Condition 1 is that the second terminal has permission to communicate with the first terminal, and Condition 2 is that the second terminal is in an online state.

Therefore, that the session management network element determines the second terminal in the second group includes the following implementations.

Implementation 1: The session management network element first determines a terminal in the second group that has permission to communicate with the first terminal. Then, the session management network element determines a terminal that is in an online state from the terminal that has permission to communicate with the first terminal.

Implementation 2: The session management network element first determines a terminal in the second group that is in an online state. Then, the session management network element determines a terminal that has permission to communicate with the first terminal from the terminal that is an online state.

Optionally, when the terminal in the second group is in an online state, the session management network element stores a session context of the terminal. The session context includes tunnel information of a session, an address of the terminal, or the like. In this way, the session management network element may determine, depending on whether the session context of the terminal is stored, whether the terminal is in an online state.

Optionally, the session management network element obtains indication information of the terminal in the second group that has permission to communicate with the first terminal, to determine the terminal in the second group that has permission to communicate with the first terminal.

In a possible design, the indication information of the terminal in the second group that has permission to communicate with the first terminal includes identifiers of one or more terminals in the second group.

For example, as shown in Table 1, the indication information may be implemented in a form of a list.

TABLE 1

| First group | Second group |
|---|---|
| Terminal #1 | Terminal #3<br>Terminal #4<br>Terminal #5 |

In another possible design, the indication information includes only an identifier of the second group. Based on this design, the session management network element may determine that any terminal in the second group has permission to communicate with the first terminal.

In this embodiment of this application, that the session management network element obtains the indication information of the terminal in the second group that has the permission to communicate with the first terminal includes: The session management network element obtains the indication information from the context stored in the session management network element. Alternatively, the session management network element obtains the indication information from another device (for example, a unified data management network element).

For example, the session management network element obtains subscription data from the unified data management network element, where the subscription data packet includes the indication information of the terminal in the second group that has permission to communicate with the first terminal. The subscription data may be subscription data of the first group, or may be subscription data of the first terminal. For an implementation in which the session management network element obtains the subscription data, refer to a conventional technology. Details are not described herein.

In this embodiment of this application, that the first terminal in the first group is allowed to communicate with the second terminal includes: The first terminal may send a packet to the second terminal, and/or the second terminal may send a packet to the first terminal.

That is, that the first terminal is allowed to communicate with the second terminal includes the following three cases.

Case 1: The first terminal may send a packet to the second terminal, and the second terminal may not send a packet to the first terminal.

Case 2: The first terminal may not send a packet to the second terminal, and the second terminal may send a packet to the first terminal.

Case 3: The first terminal may send a packet to the second terminal, and the second terminal may also send a packet to the first terminal.

Optionally, the session management network element may determine, based on a network policy, group configuration information, or terminal configuration information, a case of the communication between the first terminal and the second terminal. The group configuration information or the terminal configuration information may be obtained by the session management network element from the subscription data of the first terminal/the first group. The network policy may be preconfigured on the session management network element, or may be obtained by the session management network element from another device (for example, a policy function network element).

For example, the network policy may predefine whether cross-group communication in a 5GVN is bidirectional communication or unidirectional communication. Further, if the network policy predefines whether the cross-group communication in the 5GVN is the bidirectional communication or the unidirectional communication, the network policy may further define a direction of the unidirectional communication.

For example, the group configuration information indicates whether cross-group communication between a terminal in the first group and a terminal in the second group is bidirectional communication or unidirectional communication. Further, if the group configuration information indicates that the cross-group communication between the terminal in the first group and the terminal in the second group is the unidirectional communication, the group configuration information further indicates a direction of the cross-group communication.

For example, the terminal configuration information indicates whether cross-group communication between the first terminal and a terminal in the second group is bidirectional communication or unidirectional communication. Further, if the terminal configuration information indicates that the cross-group communication between the first terminal and the terminal in the second group is the unidirectional communication, the terminal configuration information further indicates a direction of the cross-group communication.

Optionally, the terminal configuration information is combined with the indication information of the terminal in the second group that has permission to communicate with the first terminal, and information obtained through combination may be shown in Table 2. In Table 2, if a value of communication permission is 0, it indicates that cross-group communication between two terminals is bidirectional communication; if a value of the communication permission is 1, it indicates that a terminal in the first group may send a packet to a terminal in the second group; and if a value of the communication permission is 2, it indicates that a terminal in the second group may send a packet to a terminal in the first group.

TABLE 2

| First group | Second group | Communication permission |
|---|---|---|
| Terminal #1 | Terminal #3 | 0 |
| | Terminal #4 | 1 |
| | Terminal #5 | 2 |

In this embodiment of this application, the first terminal may determine, based on an application layer message, the terminal in the second group that has permission to communicate with the first terminal. Likewise, the second terminal may also determine, based on an application layer message, a terminal in the first group that has permission to communicate with the second terminal.

If unidirectional communication is performed between the first terminal and the second terminal, a related network element in a communication system may be configured to support only the unidirectional communication between the first terminal and the second terminal. Alternatively, a related network element in a communication system may be configured to support the bidirectional communication between the first terminal and the second terminal.

Therefore, based on Case 1 in which the first terminal is allowed to communicate with the second terminal, the related network element in the communication system performs at least the following steps S102 and S103. Optionally, the related network element in the communication system may further perform the following steps S104 and S105.

Alternatively, based on Case 2 in which the first terminal is allowed to communicate with the second terminal, the related network element in the communication system performs at least the following steps S104 and S105. Optionally, the related network element in the communication system may further perform the following steps S102 and S103.

If bidirectional communication is performed between the first terminal and the second terminal, a related network element in a communication system needs to be configured to support the bidirectional communication between the first terminal and the second terminal. Therefore, based on Case 3 in which the first terminal is allowed to communicate with the second terminal, the related network element in the communication system needs to perform the following steps S102 to S105.

S102: The session management network element sends first forwarding information to a first user plane network element, and accordingly the first user plane network element receives the first forwarding information sent by the session management network element.

The first forwarding information is used by the first user plane network element to forward a first packet. The first packet is a packet to be sent by the first terminal to the second terminal. In other words, source address information of the first packet is address information of the first terminal, and destination address information is address information of the second terminal.

Optionally, the session management network element may perform step S102 in Scenario 1 or Scenario 2.

Scenario 1: In a process in which the first terminal establishes a session

In Scenario 1, the first forwarding information may be carried in an N4 session establishment request message. The N4 session establishment request message is for requesting the first user plane network element to create an N4 session of the first terminal. Optionally, in addition to the first forwarding information, the N4 session establishment request message may further include other forwarding information.

Scenario 2: In a process in which a session of the first terminal is modified after the first terminal successfully establishes the session In Scenario 2, the first forwarding information may be carried in an N4 session modification request message. The N4 session modification request message is for requesting the first user plane network element to modify the N4 session of the first terminal.

Based on the system architecture 1 for cross-group communication, the following specifically describes an implementation in which the session management network element generates the first forwarding information.

Implementation 1: When the first user plane network element and the second user plane network element are not a same user plane network element, the session management network element may generate the first forwarding information based on the address information of the second terminal and tunnel information of the second user plane network element. Therefore, the first forwarding information is specifically used to enable the first user plane network element to forward the first packet to the second user plane network element.

In this embodiment of this application, because the second terminal is an online terminal, the session management network element may obtain the address information of the second terminal and the tunnel information of the second user plane network element from the session context stored in the session management network element.

Optionally, the address information of the second terminal is used by another device to address the second terminal. In this embodiment of this application, the address information of the second terminal may be an IPv4 address, an IPv6 address, a MAC address, an international mobile equipment identity (international mobile equipment identity, an international mobile subscriber identity (international mobile subscriber identity, IMSI), a 5th generation globally unique temporary identity (5th generation-globally unique temporary identity, 5G-GUTI), or the like of the second terminal. It may be understood that, for address information of another terminal (for example, the first terminal), refer to the descriptions of the address information of the second terminal. Details are not described below again.

Optionally, for tunnel information of the second user plane network element and tunnel information of another user plane network element (for example, the first user plane network element), refer to the foregoing descriptions of the tunnel information. This is uniformly described herein, and details are not described below again.

Optionally, when the first forwarding information is implemented according to an N4 routing rule, any one of the following designs may be applied to the first forwarding information.

Design 1.1: The first forwarding information includes a first PDR, a first FAR associated with the first PDR, a second PDR, and a second FAR associated with the second PDR.

A source interface parameter of the first PDR is set to a value (for example, "access side") corresponding to an access network side. A destination interface parameter of the first FAR is set to a value (for example, "5G VN internal") corresponding to an internal interface, and Network Instance is set to an identifier of the first group or there is correspondence between a value of Network Instance and the first group. The identifier of the first group may be an internal group identifier, or may be another identifier corresponding to the internal group identifier. In an implementation, the internal group identifier of the first group is DNN+S-NSSAI, and Network Instance is set to an IP domain (IP domain) corresponding to DNN+S-NSSAI. An identifier of the second group is similar to this, and details are not described again. A source interface parameter of the second PDR is set to "5G VN internal", Network Instance is set to the identifier of the first group, and a destination address is set to the address information of the second terminal. An outer header creation parameter of the second FAR is set to the tunnel information of the second user plane network element.

Design 1.2: The first forwarding information includes a first PDR, a first FAR associated with the first PDR, a third FAR associated with the first PDR, a second PDR, and a second FAR associated with the second PDR.

A source interface parameter of the first PDR is set to "access side". A destination interface parameter of the first FAR is set to "5G VN internal", and Network Instance is set to an identifier of the first group. A destination interface parameter of the third FAR is set to "5G VN internal", and Network Instance is set to an identifier of the second group. A source interface parameter of the second PDR is set to "5G VN internal", Network Instance is set to the identifier of the second group, and a destination address is set to the address information of the second terminal. An outer header creation parameter of the second FAR is set to the tunnel information of the second user plane network element.

Implementation 2: When the first user plane network element and the second user plane network element are a same user plane network element, the session management network element may generate the first forwarding information based on the address information of the second terminal and tunnel information of a second access network device. The second access network device is an access network device that the second terminal accesses. Therefore, the first forwarding information is specifically used by the first user plane network element to forward the first packet to the second access network device.

In this embodiment of this application, because the second terminal is an online terminal, the session management network element may obtain the address information of the second terminal and the tunnel information of the second access network device from the session context stored in the session management network element.

Optionally, the tunnel information of the second access network device is for establishing a tunnel between the second user plane network element and the second access network device. The tunnel information of the second access network device may be N3 tunnel information. For example, the tunnel information of the second access network device may be address information and a port number of the second access network device.

Optionally, when the first forwarding information is implemented according to an N4 routing rule, any one of the following designs may be applied to the first forwarding information.

Design 1.3: The first forwarding information includes a first PDR, a first FAR associated with the first PDR, a second PDR, and a second FAR associated with the second PDR.

A source interface parameter of the first PDR is set to "access side". A destination interface parameter of the first FAR is set to "5G VN internal", and Network Instance is set to an identifier of the first group. A source interface parameter of the second PDR is set to "5G VN internal", Network Instance is set to the identifier of the first group, and a destination address is set to the address information of the second terminal. An outer header creation parameter of the second FAR is set to the tunnel information of the second access network device.

Design 1.4: The first forwarding information includes a first PDR, a first FAR associated with the first PDR, a third FAR associated with the first PDR, a second PDR, and a second FAR associated with the second PDR.

A source interface parameter of the first PDR is set to "access side". A destination interface parameter of the first FAR is set to "5G VN internal", and Network Instance is set to an identifier of the first group. A destination interface parameter of the third FAR is set to "5G VN internal", and Network Instance is set to an identifier of the second group. A source interface parameter of the second PDR is set to "5G VN internal", Network Instance is set to the identifier of the second group, and a destination address is set to the address information of the second terminal. An outer header creation parameter of the second FAR is set to the tunnel information of the second access network device.

S103: The first user plane network element stores the first forwarding information.

In a possible implementation, the first user plane network element stores the first forwarding information in an N4 session context of the first terminal.

In this way, after the first user plane network element receives the first packet from the first terminal, the first user plane network element may forward the first packet based on the first forwarding information.

When the first user plane network element and the second user plane network element are not a same user plane network element, the first user plane network element may forward the first packet to the second user plane network element. In a process in which the second terminal establishes a session, an N4 routing rule of the second terminal may be configured to the second user plane network element. In this way, after the second user plane network element receives the first packet, the second user plane network element may send the first packet to the second access network device according to the N4 routing rule of the second terminal. The second access network device then forwards the first packet to the second terminal, and accordingly the second terminal receives the first packet.

When the first user plane network element and the second user plane network element are a same user plane network element, the first user plane network element may forward the first packet to the second access network device. The second access network device then forwards the first packet to the second terminal, and accordingly the second terminal receives the first packet.

S104: The session management network element sends second forwarding information to the second user plane network element, and accordingly the second user plane network element receives the second forwarding information sent by the session management network element.

The second forwarding information is used by the second user plane network element to forward a second packet. The second packet is a packet to be sent by the second terminal to the first terminal. In other words, source address information of the second packet is the address information of the second terminal, and destination address information is the address information of the first terminal.

Optionally, the session management network element may perform step S104 in Scenario 1 or Scenario 2.

Scenario 1: In the process in which the first terminal establishes a session

Scenario 2: In the process in which a session of the first terminal or a group session is modified after the first terminal successfully establishes the session In Scenario 1 or Scenario 2, the second forwarding information may be carried in an N4 session modification request message. The N4 session modification request message is for requesting the second user plane network element to modify the N4 session of the second terminal.

Based on the system architecture 1 for cross-group communication, the following specifically describes an implementation in which the session management network element generates the second forwarding information.

Implementation 1: When the first user plane network element and the second user plane network element are not a same user plane network element, the session management network element may generate the second forwarding information based on the address information of the first terminal and tunnel information of the first user plane network element. Therefore, the second forwarding information is specifically used by the second user plane network element to send the second packet to the first user plane network element.

In this embodiment of this application, the session management network element may obtain the address information of the first terminal from the context stored in the session management network element.

Optionally, in the process in which the first terminal establishes a session, the session management network element may allocate the tunnel information to the first user plane network element, or the session management network element may obtain the tunnel information of the first user plane network element from the first user plane network element.

Optionally, after the first terminal successfully establishes a session, the session management network element may obtain the tunnel information of the first user plane network element from the session context of the first terminal.

Optionally, when the second forwarding information is implemented according to the N4 routing rule, any one of the following designs may be applied to the second forwarding information.

Design 2.1: The second forwarding information includes a fourth PDR, a fourth FAR associated with the fourth PDR, a fifth PDR, and a fifth FAR associated with the fifth PDR.

A source interface parameter of the fourth PDR is set to "access side". A destination interface parameter of the fourth FAR is set to "5G VN internal", and Network Instance is set to an identifier of the second group. A source interface parameter of the fifth PDR is set to "5G VN internal", Network Instance is set to the identifier of the second group, and a destination address is set to the address information of the first terminal. An outer header creation of the fifth FAR is set to the tunnel information of the first user plane network element.

Design 2.2: The second forwarding information includes a fourth PDR, a fourth FAR associated with the fourth PDR, a sixth FAR associated with the fourth PDR, a fifth PDR, and a fifth FAR associated with the fifth PDR.

A source interface parameter of the fourth PDR is set to "access side". A destination interface parameter of the fourth FAR is set to "5G VN internal", and Network Instance is set to an identifier of the second group. A destination interface parameter of the sixth FAR is set to "5G VN internal", and Network Instance is set to an identifier of the first group. A source interface parameter of the fifth PDR is set to "5G VN internal", Network Instance is set to the identifier of the second group, and a destination address is set to the address information of the second terminal. An outer header creation of the fifth FAR is set to the tunnel information of the first user plane network element.

Implementation 2: When the first user plane network element and the second user plane network element are a same user plane network element, the session management network element may generate the second forwarding information based on the address information of the first terminal and tunnel information of a first access network device. The first access network device is an access network device that the first terminal accesses. Therefore, the second forwarding information is specifically used by the second user plane network element to send the second packet to the first access network device.

Optionally, the tunnel information of the first access network device is for establishing a tunnel between the first user plane network element and the first access network device. The tunnel information of the first access network device may be N3 tunnel information. For example, the tunnel information of the first access network device may be address information and a port number of the first access network device.

Optionally, in the process in which the first terminal establishes a session, the session management network element may obtain the tunnel information of the first access network device from a mobility management network element. Alternatively, after the first terminal successfully establishes a session, the session management network element may obtain the tunnel information of the first access network device from the session context of the first terminal.

Optionally, when the second forwarding information is implemented according to the N4 routing rule, any one of the following designs may be applied to the second forwarding information.

Design 2.3: The second forwarding information includes a fourth PDR, a fourth FAR associated with the fourth PDR, a fifth PDR, and a fifth FAR associated with the fifth PDR.

A source interface parameter of the fourth PDR is set to "access side". A destination interface parameter of the fourth FAR is set to "5G VN internal", and Network Instance is set to an identifier of the second group. A source interface parameter of the fifth PDR is set to "5G VN internal", Network Instance is set to the identifier of the second group, and a destination address is set to the address information of the first terminal. An outer header creation parameter of the fifth FAR is set to the tunnel information of the first access network device.

Design 2.4: The second forwarding information includes a fourth PDR, a fourth FAR corresponding to the fourth PDR and a sixth FAR, a fifth PDR, and a fifth FAR corresponding to the fifth PDR.

A source interface parameter of the fourth PDR is set to "access side". A destination interface parameter of the fourth FAR is set to "5G VN internal", and Network Instance is set to an identifier of the second group. A destination interface parameter of the sixth FAR is set to "5G VN internal", and Network Instance is set to an identifier of the first group. A source interface parameter of the fifth PDR is set to "5G VN internal", Network Instance is set to the identifier of the second group, and a destination address is set to the address information of the second terminal. An outer header creation parameter of the fifth FAR is set to the tunnel information of the first access network device.

S105: The second user plane network element stores the second forwarding information.

In a possible implementation, the second user plane network element stores the second forwarding information in an N4 session context of the second terminal.

In this way, after the second user plane network element receives the second packet from the second terminal, the second user plane network element may forward the second packet based on the second forwarding information.

When the first user plane network element and the second user plane network element are not a same user plane network element, the second user plane network element may forward the second packet to the first user plane network element. In the process in which the first terminal establishes a session, an N4 routing rule (such as the first forwarding information mentioned above) of the first terminal may be configured to the first user plane network element. In this way, the first user plane network element may forward the second packet to the first access network device according to the N4 routing rule of the first terminal. The first access network device then forwards the second packet to the first terminal, and accordingly the first terminal receives the second packet.

When the first user plane network element and the second user plane network element are a same user plane network element, the second user plane network element may forward the second packet to the first access network device. The first access network device then forwards the second packet to the first terminal, and accordingly the first terminal receives the second packet.

In this embodiment of this application, when both steps S102 and S103 and steps S104 and S105 need to be performed, a sequence of performing steps S102 and S103 and steps S104 and S105 is not limited. For example, steps S102 and S103 may be first performed, and then steps S104 and S105 are performed. Alternatively, steps S104 and S105 are first performed, and then steps S102 and S103 are performed. Alternatively, steps S102 and S103 and steps S104 and S105 are simultaneously performed.

Based on the technical solution shown in FIG. 8, the session management network element may configure the first forwarding information for the first user plane network element, and/or configure the second forwarding information for the second user plane network element, so that the first terminal in the first group can communicate with the second terminal in the second group, so that a cross-group communication function in a 5GVN can be implemented.

Based on the system architecture 2 for cross-group communication, the following specifically describes a route configuration method provided in an embodiment of this application.

Figure 9:
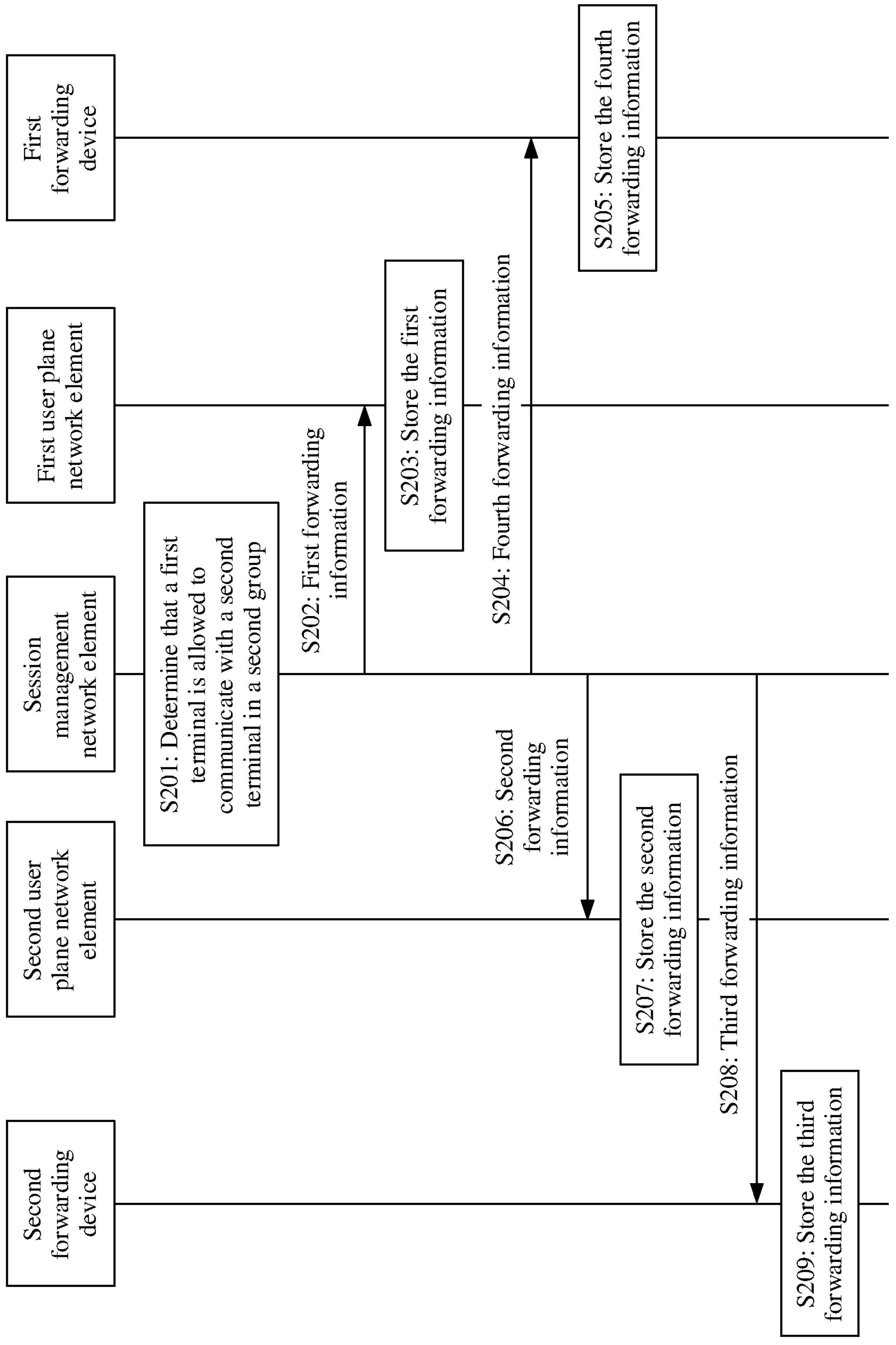
FIG. 9 is a flowchart of another route configuration method according to an embodiment of this application.

As shown in FIG. 9, the route configuration method includes the following steps.

S201: A session management network element determines that a first terminal in a first group is allowed to communicate with a second terminal in a second group.

For descriptions of step S201, refer to step S101. Details are not described herein again.

If unidirectional communication is performed between the first terminal and the second terminal, a related network element in a communication system may be configured to support only the unidirectional communication between the first terminal and the second terminal. Alternatively, a related network element in a communication system may be configured to support the bidirectional communication between the first terminal and the second terminal.

Therefore, based on Case 1 in which the first terminal is allowed to communicate with the second terminal, the related network element in the communication system performs at least the following steps S202 to S205. Optionally, the related network element in the communication system may further perform the following steps S206 to S209.

Alternatively, based on Case 2 in which the first terminal is allowed to communicate with the second terminal, the related network element in the communication system performs at least the following steps S206 to S209. Optionally, the related network element in the communication system may further perform the following steps S202 to S205.

If bidirectional communication is performed between the first terminal and the second terminal, a related network element in a communication system needs to be configured to support the bidirectional communication between the first terminal and the second terminal. Therefore, based on Case 3 in which the first terminal is allowed to communicate with the second terminal, the related network element in the communication system needs to perform the following steps S202 to S209.

It may be understood that a sequence of performing steps S202 and S203, steps S204 and S205, steps S206 and S207, and steps S208 and S209 is not limited in this embodiment of this application.

S202: The session management network element sends first forwarding information to a first user plane network element, and accordingly the first user plane network element receives the first forwarding information sent by the session management network element.

The first forwarding information is used by the first user plane network element to forward a first packet.

Optionally, the session management network element may perform step S203 in Scenario 1 or Scenario 2.

Scenario 1: In a process in which the first terminal establishes a session

In Scenario 1, the first forwarding information may be carried in an N4 session establishment request message. The N4 session establishment request message is for requesting the first user plane network element to create an N4 session of the first terminal. Optionally, in addition to the first forwarding information, the N4 session establishment request message may further include other forwarding information.

Scenario 2: In a process in which a session of the first terminal is modified after the first terminal successfully establishes the session In Scenario 2, the first forwarding information may be carried in an N4 session modification request message. The N4 session modification request message is for requesting the first user plane network element to modify the N4 session of the first terminal.

Optionally, the first forwarding information is generated based on address information of the second terminal and tunnel information of a first forwarding device. Therefore, the first forwarding information is specifically used by the first user plane network element to forward the first packet to the first forwarding device.

Alternatively, the first forwarding information is generated based on an address segment corresponding to the second group and tunnel information of a first forwarding device. Therefore, the first forwarding information is specifically used by the first user plane network element to forward a packet (such as the second packet) to the first forwarding device, where the packet is sent by the first terminal to any terminal in the second group.

In this embodiment of this application, the first forwarding device is responsible for forwarding the packet destined for the terminal in the second group. The first forwarding device may be a user plane network element that provides a service for one or more terminals in the second group, or the first forwarding device may be a device other than a user plane network element that provides a service for one or more terminals in the second group.

For example, UPF1 provides a service for UE1 and UE2 in the first group, UPF2 provides a service for UE3 in the first group, UPF3 provides a service for UE4 in the second group, and UPF4 provides a service for UE5 in the second group. In this case, UPF3 or UPF4 may be selected as a second forwarding device.

In this embodiment of this application, the session management network element may obtain the tunnel information of the first forwarding device from the context stored in the session management network element.

Optionally, when the first forwarding information is implemented according to an N4 routing rule, any one of the following designs may be applied to the first forwarding information.

Design 1.5: The first forwarding information includes a first PDR, a first FAR associated second the first PDR, a second PDR, a second FAR associated with the first PDR, a seventh PDR, and a seventh FAR associated with the seventh PDR.

A source interface parameter of the first PDR is set to "access side". A destination interface parameter of the first FAR is set to "5G VN internal", and Network Instance is set to an identifier of the first group. A source interface parameter of the second PDR is set to "5G VN internal", and Network Instance is set to the identifier of the first group. A destination interface parameter of the second FAR is set to "5G VN internal", and Network Instance is set to an identifier of the second group. A source interface parameter of the seventh PDR is set to "5G VN internal", Network Instance is set to the identifier of the second group, and a destination address is set to the address information of the second terminal or the address segment corresponding to the second group. An outer header creation parameter of the seventh FAR is set to the tunnel information of the first forwarding device.

Design 1.6: The first forwarding information includes a first PDR and a first FAR associated with the first PDR.

A destination address of the first PDR is set to the address segment corresponding to the second group or the address information of the second terminal. A destination interface parameter of the first FAR is set to "5G VN internal", Network Instance is set to an identifier of the second group, and an outer header creation parameter is set to the tunnel information of the first forwarding device.

Based on Design 1.6, a priority of the first PDR may be set to a high priority, so as to reduce time in which a packet to be sent by the first terminal to the second terminal matches the first PDR.

In this embodiment of this application, the session management network element may determine the first forwarding device in any one of the following manners.

Manner 1: The session management network element obtains information about the first forwarding device from another device (for example, a UDM). For example, the information of the first forwarding device may be address information, identifier, or the like.

Manner 2: After a terminal in the second group goes online, the session management network element determines a user plane network element that serves the terminal as the first forwarding device.

Manner 3: The session management network element determines the first forwarding device based on the address segment corresponding to the second group. In other words, the first forwarding device is a device responsible for routing/forwarding a data packet of the address segment corresponding to the second group.

For example, UPF #1 is responsible for forwarding data packets from 192.168.1.1 to 192.168.110, and UPF #2 is responsible for forwarding data packets from 192.168.111 to 192.168.150. If the address segment corresponding to the second group is 192.168.1.1 to 192.168.1.50, the session management network element may determine that UPF #1 is the first forwarding device.

S203: The first user plane network element stores the first forwarding information.

In a possible implementation, the first user plane network element may store the first forwarding information in a session context of the first group.

In this way, after the first user plane network element receives the first packet from the first terminal, the first user plane network element may forward the first packet based on the first forwarding information.

S204: The session management network element sends fourth forwarding information to the first forwarding device, and accordingly the first forwarding device receives the fourth forwarding information sent by the session management network element.

The fourth forwarding information is used by the first forwarding device to forward the first packet.

Optionally, the session management network element may perform step S205 in Scenario 1, Scenario 2, Scenario 3, or Scenario 4.

Scenario 1: In the process in which the first terminal establishes a session

Scenario 2: In the process in which a session of the first terminal is modified after the first terminal successfully establishes the session Scenario 3: In a process in which the second terminal establishes a session Scenario 4: During a period of time after the second terminal successfully establishes a session and before the first terminal establishes a session For example, Scenario 4 may be specifically a process in which a terminal other than the second terminal in the second group establishes a session, or a process in which a terminal other than the first terminal in the first group establishes a session.

Optionally, when the first forwarding device is the second user plane network element, the fourth forwarding information is generated based on address information of the second terminal and tunnel information of a second access network device. Therefore, the fourth forwarding information is used by the first forwarding device to send the first packet to the second access network device.

Optionally, when the first forwarding device is not the second user plane network element, the fourth forwarding information is generated based on the address information of the second terminal and tunnel information of the second user plane network element. Therefore, the fourth forwarding information is used by the first forwarding device to send the first packet to the second user plane network element.

Optionally, if the first forwarding device is the user plane network element that provides a service for one or more terminals in the second group, the fourth forwarding information may reuse an N4 routing rule of the terminal in the second group that is served by the first forwarding device.

S205: The first forwarding device stores the fourth forwarding information.

When the first forwarding device receives the packet to be sent by the first terminal to the second terminal, the first forwarding device may forward, based on the fourth forwarding information, the packet to be sent by the first terminal to the second terminal, so as to support cross-group communication between the first terminal and the second terminal.

In this way, after the first forwarding device receives the first packet from the first user plane network element, the first forwarding device may forward the first packet based on the fourth forwarding information.

Optionally, when the first forwarding device is not the second user plane network element, a transmission procedure of the first packet in a 5GVN is as follows: The first user plane network element sends the first packet to the first forwarding device based on the first forwarding information. The first forwarding device sends the first packet to the second user plane network element based on the fourth forwarding information. In a process in which the second terminal establishes a session, an N4 routing rule of the second terminal may be configured to the second user plane network element. In this way, after the second user plane network element receives the first packet, the second user plane network element may send the first packet to the second access network device according to the N4 routing rule of the second terminal. The second access network device then forwards the first packet to the second terminal, and accordingly the second terminal receives the first packet.

Optionally, when the first forwarding device is the second user plane network element, a transmission procedure of the first packet in a 5GVN is as follows: The first user plane network element forwards the first packet to the first forwarding device based on the first forwarding information. The first forwarding device sends the first packet to the second access network device based on the fourth forwarding information. The second access network device then forwards the first packet to the second terminal, and accordingly the second terminal receives the first packet.

S206: The session management network element sends the second forwarding information to the second user plane network element, and accordingly the second user plane network element receives the second forwarding information sent by the session management network element.

The second forwarding information is used by the second user plane network element to forward a second packet.

Optionally, the session management network element may perform step S205 in Scenario 1, Scenario 2, Scenario 3, or Scenario 4.

Scenario 1: In the process in which the first terminal establishes a session

Scenario 2: In the process in which a session of the first terminal is modified after the first terminal successfully establishes the session Scenario 3: In a process in which the second terminal establishes a session Scenario 4: During a period of time after the second terminal successfully establishes a session and before the first terminal establishes a session For example, Scenario 4 may be specifically a process in which a terminal other than the second terminal in the second group establishes a session, or a process in which a terminal other than the first terminal in the first group establishes a session.

Optionally, the second forwarding information is generated based on address information of the first terminal and tunnel information of a second forwarding device. Therefore, the second forwarding information is specifically used by the second user plane network element to forward the second packet to the second forwarding device.

Alternatively, the second forwarding information is generated based on an address segment corresponding to the second group and tunnel information of a second forwarding device. Therefore, the second forwarding information is specifically used by the second user plane network element to forward a packet (such as the second packet) to the first forwarding device, where the packet is sent by the second terminal to any terminal in the first group.

In this embodiment of this application, the second forwarding device is responsible for forwarding the packet destined for the terminal in the first group. The second forwarding device may be a user plane network element that provides a service for one or more terminals in the first group, or the second forwarding device may be a device other than a user plane network element that provides a service for one or more terminals in the first group.

For example, UPF1 provides a service for UE1 and UE2 in the first group, UPF2 provides a service for UE3 in the first group, UPF3 provides a service for UE4 in the second group, and UPF4 provides a service for UE5 in the second group. In this case, UPF1 or UPF2 may be selected as a second forwarding device.

In this embodiment of this application, the session management network element may obtain the tunnel information of the second forwarding device from the context stored in the session management network element.

Optionally, when the second forwarding information is implemented according to the N4 routing rule, any one of the following designs may be applied to the second forwarding information.

Design 2.5: The second forwarding information includes a fourth PDR, a fourth FAR associated with the fourth PDR, a fifth PDR, a fifth FAR associated with the fifth PDR, an eighth PDR, and an eighth FAR associated with the eighth PDR.

A source interface parameter of the fourth PDR is set to “access side”. A destination interface parameter of the fourth FAR is set to “5G VN internal”, and Network Instance is set to an identifier of the second group. A source interface parameter of the fifth PDR is set to “5G VN internal”, and Network Instance is set to the identifier of the second group. A destination interface parameter of the fifth FAR is set to “5G VN internal”, and Network Instance is set to an identifier of the first group. A source interface parameter of the eighth PDR is set to “5G VN internal”, Network Instance is set to an identifier of the first group, and a destination address is set to the address information of the first terminal or the address segment corresponding to the first group. An outer header creation parameter of the eighth FAR is set to the tunnel information of the second forwarding device.

Design 2.6: The second forwarding information includes a fourth PDR and a fourth FAR associated with the fourth PDR.

A destination address of the fourth PDR is set to the address information of the first terminal or the address segment corresponding to the first group. A destination interface parameter of the fourth FAR is set to “5G VN internal”, Network Instance is set to an identifier of the first group, and an outer header creation parameter is set to the tunnel information of the second forwarding device.

In this embodiment of this application, the session management network element may determine the second forwarding device in any one of the following manners.

Manner 1: The session management network element obtains information about the second forwarding device from another device (for example, a UDM). For example, the information of the second forwarding device may be address information, identifier, or the like.

Manner 2: After a terminal in the first group goes online, the session management network element determines a user plane network element that serves the terminal as the second forwarding device.

Manner 3: The session management network element determines the second forwarding device based on the address segment corresponding to the first group. In other words, the second forwarding device is a device responsible for routing/forwarding a data packet of the address segment corresponding to the first group.

S207: The second user plane network element stores the second forwarding information.

In a possible implementation, the second user plane network element stores the second forwarding information in a session context corresponding to the second group.

In this way, after the second user plane network element receives the second packet from the second terminal, the second user plane network element may forward the second packet based on the second forwarding information.

S208: The session management network element sends third forwarding information to the second forwarding device, and accordingly the second forwarding device receives the third forwarding information sent by the session management network element.

The third forwarding information is used by the second forwarding device to forward the second packet.

Optionally, the session management network element may perform step S208 in Scenario 1 or Scenario 2.

Scenario 1: In the process in which the first terminal establishes a session

Scenario 2: In the process in which a session of the first terminal is modified after the first terminal successfully establishes the session Optionally, when the second forwarding device is the first user plane network element, the third forwarding information is generated based on address information of the first terminal and tunnel information of a first access network device. Therefore, the third forwarding information is used by the second forwarding device to forward the second packet to the first access network device.

Optionally, when the second forwarding device is not the first user plane network element, the third forwarding information is generated based on the address information of the first terminal and tunnel information of the first user plane network element. Therefore, the third forwarding information is specifically used by the second forwarding device to forward the second packet to the first user plane network element.

Optionally, if the second forwarding device is the user plane network element that provides a service for one or more terminals in the first group, the third forwarding information may reuse an N4 routing rule of the terminal in the first group that is served by the second forwarding device.

S209: The second forwarding device stores the third forwarding information.

In this way, after the second forwarding device receives the second packet, the second forwarding device may forward the second packet based on the third forwarding information.

Optionally, when the second forwarding device is not the first user plane network element, a transmission procedure of the second packet in a 5GVN is as follows: The second user plane network element sends the second packet to the second forwarding device based on the second forwarding information. The second forwarding device sends the first packet to the first user plane network element based on the third forwarding information. In the process in which the first terminal establishes a session, an N4 routing rule of the first terminal may be configured to the first user plane network element. In this way, after the first user plane network element receives the second packet, the first user plane network element may send the second packet to the first access network device according to the N4 routing rule of the first terminal. The first access network device then forwards the second packet to the first terminal, and accordingly the first terminal receives the second packet.

Optionally, when the second forwarding device is the first user plane network element, a transmission procedure of the second packet in a 5GVN is as follows: The second user plane network element sends the second packet to the second forwarding device based on the second forwarding information. The second forwarding device sends the second packet to the first access network device based on the third forwarding information. The first access network device then forwards the second packet to the first terminal, and accordingly the first terminal receives the second packet.

Based on the technical solution shown in FIG. 9, the session management network element may configure the first forwarding information for the first user plane network element or configure the fourth forwarding information for the first forwarding device, so that the communication system may support forwarding of the first packet; and/or the session management network element may configure the second forwarding information for the second user plane network element or configure the third forwarding information for the second forwarding device, so that the communication system may support forwarding of the second packet.

The technical solution shown in FIG. 9 is applicable to a scenario in which the first user plane network element is different from the second user plane network element.

Optionally, in a case in which a communication mode between the first terminal and the second terminal is bidirectional communication, the session management network element may configure corresponding forwarding information with reference to the system architecture 1 for cross-group communication and the system architecture 2 for cross-group communication.

For example, to support forwarding of the first packet, the session management network element applies the route configuration method (for example, the technical solution shown in FIG. 8) based on the architecture 1 for a cross-group communication system. To support forwarding of the second packet, the session management network element applies the route configuration method (for example, the technical solution shown in FIG. 9) based on the architecture 2 for a cross-group communication system.

For another example, to support forwarding of the first packet, the session management network element applies the route configuration method based on the architecture 2 for a cross-group communication system. To support forwarding of the second packet, the session management network element applies the route configuration method based on the architecture 1 for a cross-group communication system.

The communication system shown in FIG. 1 is used as an example for description. As shown in FIG. 1, the communication system may include the SMF and UPF1. It is assumed that the terminal 1 belongs to the first group, the terminal 2 belongs to the second group, and the terminal 2 has permission to communicate with the terminal 1. Before the terminal 1 goes online, the terminal 2 has been online, and UPF1 provides a service for the terminal 2. In a process in which the terminal 1 establishes a PDU session, the SMF allocates UPF1 to provide a service for the terminal 1. The SMF determines that the terminal 1 is allowed to communicate with the terminal 2. Therefore, the SMF may send forwarding information 1 to UPF1, and the forwarding information 1 is used by UPF1 to forward, to a RAN node 2, a packet to be sent by the terminal 1 to the terminal 2. UPF1 stores the forwarding information 1. In addition, the SMF may further send forwarding information 2 to UPF1, and the forwarding information 2 is used by UPF1 to forward, to a RAN node 1, a packet to be sent by the terminal 2 to the terminal 1.

Further, as shown in FIG. 1, the communication system may also include UPF2. It is assumed that the terminal 3 belongs to the second group, and the terminal 3 has permission to communicate with the terminal 1. Before the terminal 1 goes online, the terminal 3 has been online, and UPF2 provides a service for the terminal 3.

Based on the technical solution shown in FIG. 8, in the process in which the terminal 1 establishes a PDU session, or after the terminal 1 establishes a PDU session, the SMF determines that the terminal 1 is allowed to communicate with the terminal 3. Therefore, the SMF may send forwarding information 3 to UPF1, and the forwarding information 3 is used by UPF1 to forward, to UPF2, a packet to be sent by the terminal 1 to the terminal 3. UPF1 stores the forwarding information 3. In addition, the SMF may further send forwarding information 4 to UPF2, and the forwarding information 4 is used by UPF2 to forward, to UPF1, a packet to be sent by the terminal 3 to the terminal 1. UPF2 stores the forwarding information 4.

Figure 10:
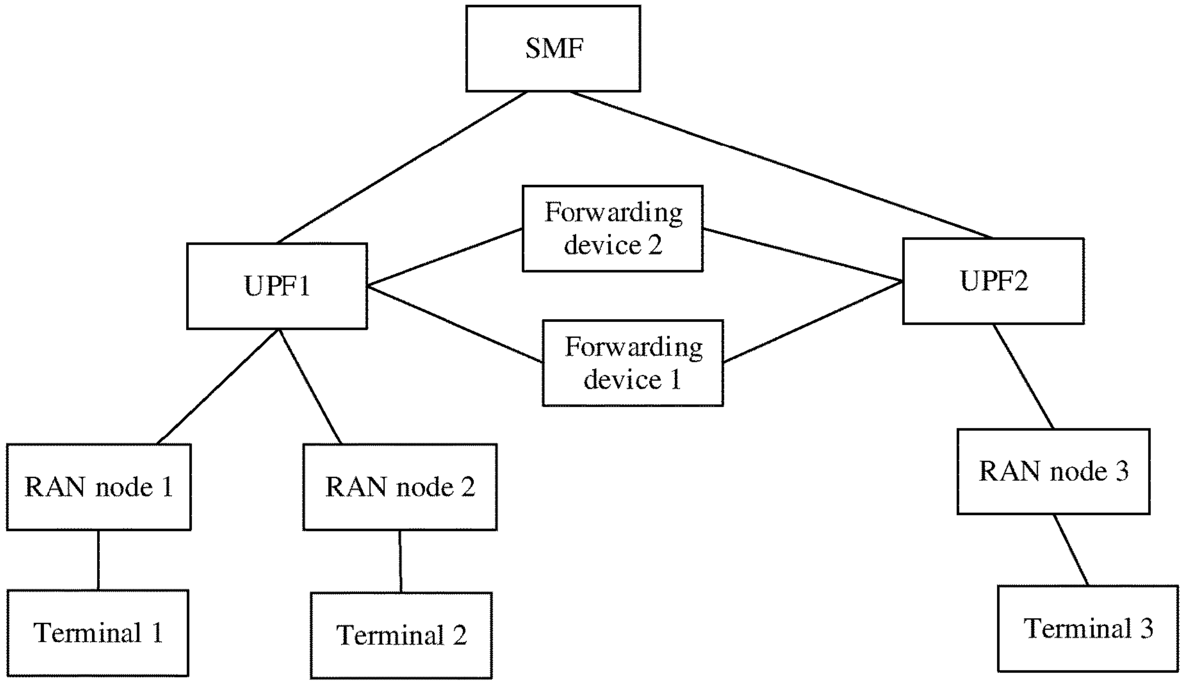
FIG. 10 is a schematic diagram of an architecture of a communication system according to an embodiment of this application.

Alternatively, as shown in FIG. 10, the communication system may also include UPF2 and a forwarding device 1. It is assumed that a terminal 3 belongs to a second group, and the terminal 3 has permission to communicate with a terminal 1. Before the terminal 1 goes online, the terminal 3 has been online, and UPF2 provides a service for the terminal 3.

Based on the technical solution shown in FIG. 9, the SMF determines that the terminal 1 is allowed to communicate with the terminal 3. Therefore, the SMF may send the forwarding information 3 to UPF1, and the SMF sends forwarding information 5 to the forwarding device 1. The forwarding information 3 is used by UPF1 to forward, to the forwarding device 1, a packet to be sent by the terminal 1 to the terminal 3. The forwarding information 5 is used by the forwarding device 1 to forward, to UPF2, a packet to be sent by the terminal 1 to the terminal 3. UPF1 stores the forwarding information 3. The forwarding device 1 stores the forwarding information 5.

As shown in FIG. 10, the communication system may also include a forwarding device 2. Based on the technical solution shown In FIG. 9, the SMF may send the forwarding information 4 to UPF2, and the SMF may send forwarding information 6 to the forwarding device 2. The forwarding information 4 is used by UPF2 to forward, to the forwarding device 2, a packet to be sent by the terminal 3 to the terminal 1. The forwarding information 6 is used by the forwarding device 2 to forward, to UPF1, a packet to be sent by the terminal 3 to the terminal 1. UPF2 stores the forwarding information 4. The forwarding device 2 stores the forwarding information 6.

Optionally, the communication system may further include another network element, for example, an application function entity, a unified data management network element, or an exposure function network element.

Figure 11:
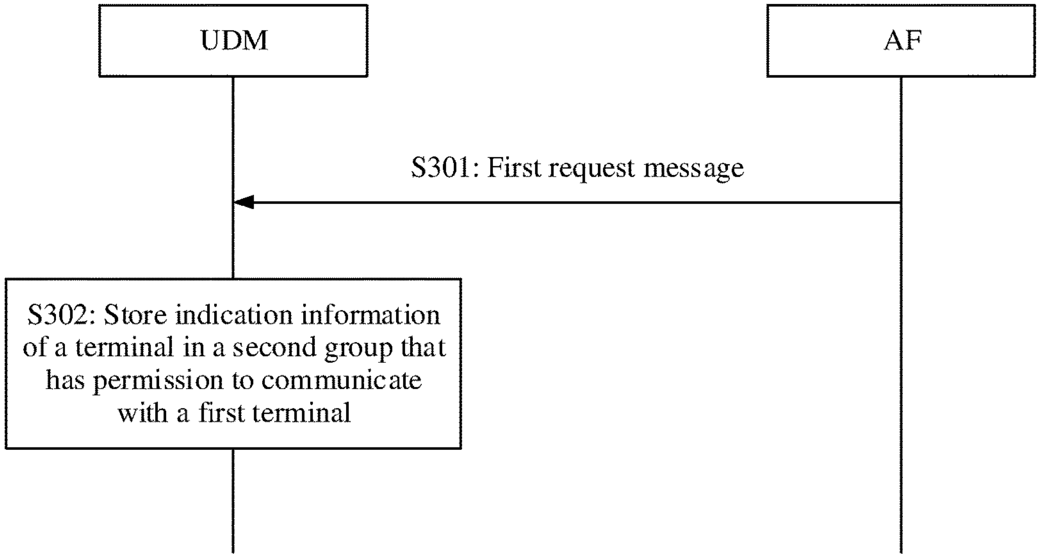
FIG. 11 is a flowchart of another route configuration method according to an embodiment of this application.

FIG. 11 shows a route configuration method provided in this embodiment of this application. The method includes the following steps.

S301: An AF sends a first request message to an UDM, and accordingly the UDM receives the first request message sent by the AF.

The first request message is used to create or update a first group. Optionally, the first request message may have another name, for example, a group creation/update request message.

In this embodiment of this application, the first request message may include an identifier of the first group.

The first request message includes indication information of a terminal that is in a second group and that has permission to communicate with a first terminal. The first terminal may be any terminal in the first group. To implement this function, any one of the following designs may be applied to the first request message.

Design 3.1: The first request message further includes an identifier of the second group.

Based on Design 3.1, any terminal in the first group may communicate with any terminal in the second group.

Design 3.2: The first request message further includes an identifier of the second group and communication list information. The communication list information includes identifiers of one or more terminals in the second group.

Based on Design 3.2, the communication list information included in the first request message is applicable to any terminal in the first group. Therefore, any terminal in the first group may communicate with any terminal indicated by the communication list information.

Design 3.3: The first request message may further include identifiers of M terminals in the first group, an identifier of the second group, and communication list information. M is a positive integer.

Based on Design 3.3, communication list information corresponding to each of the M terminals in the first group is the communication list information included in the first request message. In other words, any one of the M terminals in the first group may communicate with any terminal indicated by the communication list information. A terminal other than the M terminals in the first group cannot communicate with the terminal in the second group.

Design 3.4: The first request message may further include identifiers of M terminals in the first group, an identifier of the second group, and M pieces of communication list information. The M pieces of communication list information are in one-to-one correspondence with the M terminals.

Based on Design 3.4, one of the M terminals may communicate with any terminal indicated by communication list information corresponding to the terminal. A terminal other than the M terminals in the first group cannot communicate with the terminal in the second group.

Optionally, a type of cross-group communication may be predefined in a protocol. For example, it may be predefined that the terminal in the first group and the terminal in the second group perform bidirectional communication or unidirectional communication. In addition, the protocol may further predefine a communication direction of the unidirectional communication.

Optionally, the first request message may further include communication type information, and the communication type information indicates a communication type of cross-group communication. To be specific, the group configuration information indicates whether the terminal in the first group and the terminal in the second group perform bidirectional communication or unidirectional communication. When the communication type information indicates that the cross-group communication type is the unidirectional communication, the communication type information may further indicate a communication direction of the unidirectional communication. For example, the communication type information may indicate that the first terminal may send a packet to the second terminal. Alternatively, the communication type information may indicate that the first terminal may send a packet to the second terminal.

In a possible implementation, the AF sends the first request message to an NEF. The NEF then sends the first request message to the UDM.

Optionally, after receiving the first request message, the UDM may verify whether the first request message is valid. If the first request message is invalid, the UDM does not perform the following step S302. If the first request message is valid, the UDM may continue to perform the following step S302.

Optionally, if the identifier of the first group carried in the first request message is an external group identifier, the NEF or the UDM may map the external group identifier to an internal group identifier. For example, the external group ID is mapped to the internal group ID, or DNN+S-NSSAI is mapped to the internal group ID.

When the NEF maps the external group identifier to the internal group identifier, the NEF sends, to the UDM, a correspondence between the external group identifier and the internal group identifier.

S302: The UDM stores the indication information of the terminal in the second group that has permission to communicate with the first terminal.

In a possible implementation, the UDM may store, in subscription data of the first group, the indication information of the terminal in the second group that has permission to communicate with the first terminal.

In another possible implementation, the UDM may store, in subscription data of the first terminal in the first group, the indication information of the terminal in the second group that has permission to communicate with the first terminal.

Figure 12:
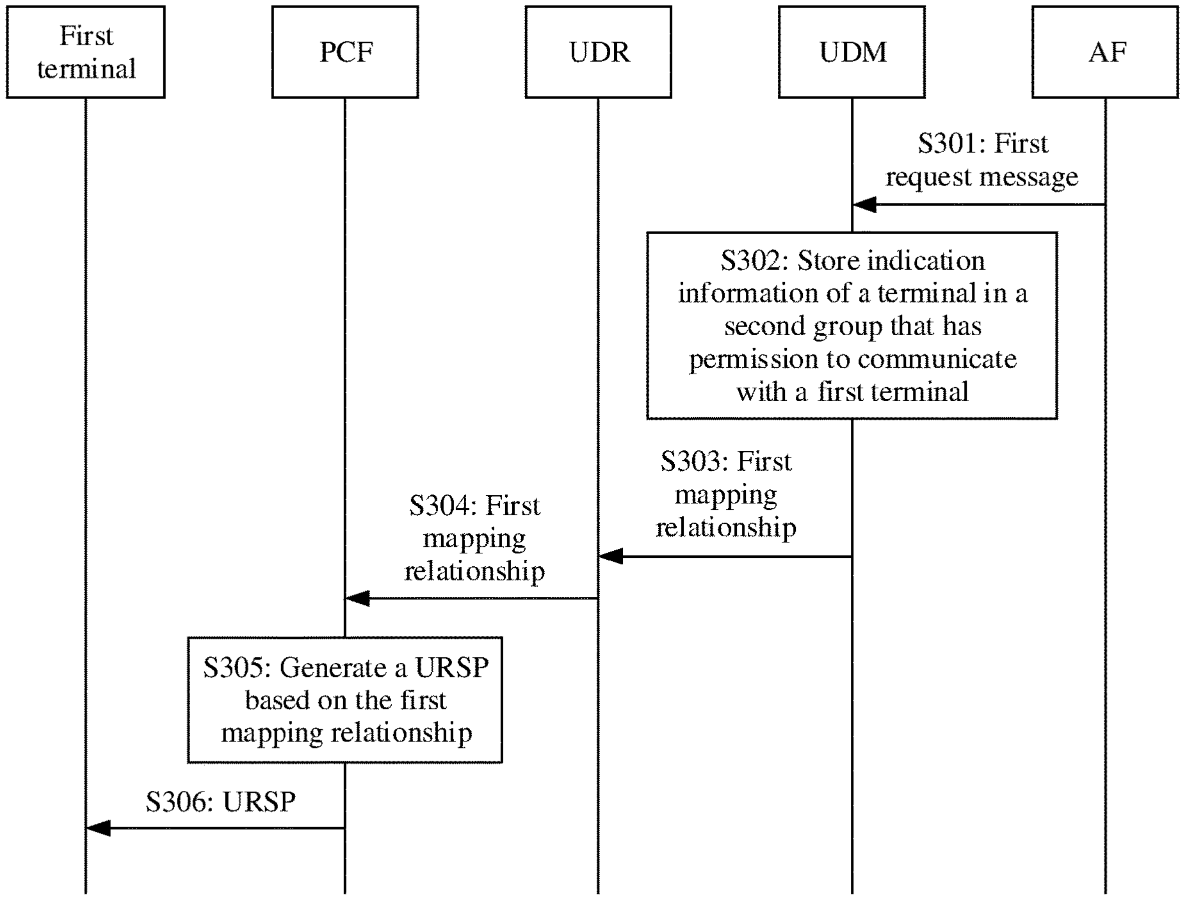
FIG. 12 is a flowchart of another route configuration method according to an embodiment of this application.

Optionally, based on the solution shown in FIG. 11, as shown in FIG. 12, after step S302, the configuration method may further include the following steps.

S303: The UDM sends a first mapping relationship to a unified data repository (unified data repository, UDR).

The first mapping relationship is a mapping relationship between a DNN+S-NSSAI identifier and the internal group ID.

In a possible implementation, the UDM sends subscription data to the UDR, where the subscription data packet includes the first mapping relationship.

S304: The UDR sends the first mapping relationship to a PCF, and the PCF accordingly receives the first mapping relationship.

In a possible implementation, the UDR may actively send the first mapping relationship to the PCF.

In another possible implementation, the UDR may send the first mapping relationship to the PCF after the PCF requests the first mapping relationship.

S305: The PCF generates a user terminal route selection policy (UE route selection policy, URSP) based on the first mapping relationship.

The URSP indicates a correspondence between an identifier of a target application and the DNN+S-NSSAI identifier. There may be one or more target applications.

Optionally, the target application may be preconfigured, or may be determined by the PCF based on a status of the first terminal. This is not limited in this embodiment of this application.

S306: The PCF sends the URSP to the first terminal, and the first terminal accordingly receives the URSP sent by the PCF.

Based on the technical solution shown in FIG. 12, after the first terminal receives the URSP, when the first terminal uses the target application, a session establishment request message that may be initiated by the first terminal to a network side may include the DNN+S-NSSAI identifier corresponding to the target application.

The foregoing mainly describes the solutions in embodiments of this application from a perspective of interaction between network elements. It may be understood that, to implement the foregoing functions, network elements such as the session management network element and the user plane network element include corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the session management network element and the user plane network element may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in this embodiment of this application, division into the units is an example, and is merely a logical function division. In actual implementation, another division manner may be used.

Figure 13:
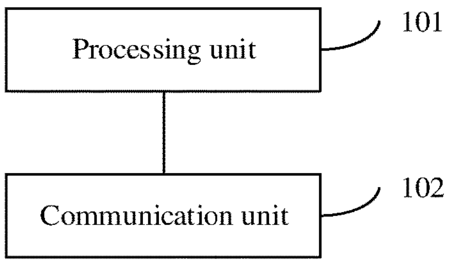
FIG. 13 is a schematic diagram of a structure of a communication apparatus according to an embodiment of this application.

When an integrated unit is used, FIG. 13 shows a communication apparatus in the foregoing embodiments. The communication apparatus may include a processing unit 101 and a communication unit 102.

In an example, the communication apparatus may be the session management network element mentioned above, or a chip used in the session management network element. In this case, the processing unit 101 is configured to support the session management network element in performing step S101 in FIG. 8, step S201 in FIG. 9, and/or another processing operation that needs to be performed by the session management network element in embodiments of this application. The communication unit 102 is configured to support the session management network element in performing steps S102 and S104 in FIG. 8, steps S202, S204, S206, and S208 in FIG. 9, and/or another communication operation that needs to be performed by the session management network element in embodiments of this application.

In another example, the communication apparatus may be the first user plane network element mentioned above, or a chip used in the first user plane network element. In this case, the processing unit 101 is configured to support the first user plane network element in performing step S103 in FIG. 8, step S203 in FIG. 9, and/or another processing operation that needs to be performed by the first user plane network element in embodiments of this application. The communication unit 102 is configured to support the first user plane network element in performing step S102 in FIG. 8, step S202 in FIG. 9, and/or another communication operation that needs to be performed by the first user plane network element in embodiments of this application.

In another example, the communication apparatus may be the second user plane network element mentioned above, or a chip used in the second user plane network element. In this case, the processing unit 101 may support the second user plane network element in performing step S105 in FIG. 8, step S207 in FIG. 9, and/or another processing operation that needs to be performed by the second user plane network element in embodiments of this application. The communication unit 102 is configured to support the second user plane network element in performing step S104 in FIG. 8, step S206 in FIG. 9, and/or another communication operation that needs to be performed by the second user plane network element in embodiments of this application.

In another example, the communication apparatus may be the first forwarding device mentioned above, or a chip used in the first forwarding device. In this case, the processing unit 101 may support the first forwarding device in performing step S205 in FIG. 9, and/or another processing operation that needs to be performed by the first forwarding device in embodiments of this application. The communication unit 102 may support the first forwarding device in performing step S204 in FIG. 9, and/or another communication operation that needs to be performed by the first forwarding device in embodiments of this application.

In another example, the communication apparatus may be the second forwarding device mentioned above, or a chip used in the second forwarding device. In this case, the processing unit 101 may support the second forwarding device in performing step S209 in FIG. 9, and/or another processing operation that needs to be performed by the second forwarding device in embodiments of this application. The communication unit 102 may support the second forwarding device in performing step S208 in FIG. 9, and/or another communication operation that needs to be performed by the second forwarding device in embodiments of this application.

When the integrated unit in FIG. 13 is implemented in a form of a software functional module and sold or used as an independent product, the integrated unit may be stored in a computer-readable storage medium. Based on such understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) or a processor (processor) to perform all or some of the steps of the methods in embodiments of this application. The storage medium that stores the computer software product includes any medium that can store program code, such as a USB flash drive, a removable hard disk, a read-only memory (read-only memory, ROM), a random access memory (random access memory, RAM), a magnetic disk, or an optical disc.

The unit in FIG. 13 may also be referred to as a module. For example, the processing unit may be referred to as a processing module, and the communication unit may be referred to as a communication module.

Figure 14:
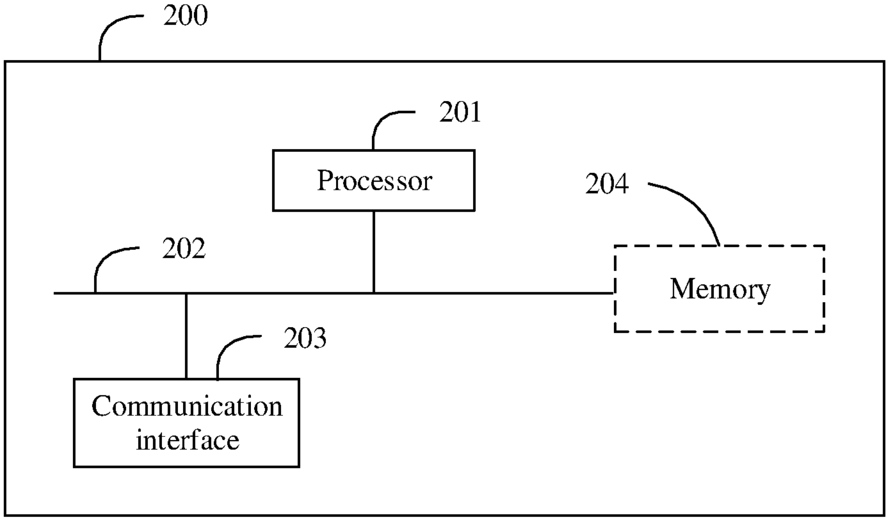
FIG. 14 is a schematic diagram of a structure of another communication apparatus according to an embodiment of this application.

FIG. 14 is a schematic diagram of a hardware structure of a communication apparatus according to an embodiment of this application. The communication apparatus 200 includes one or more processors 201 and a communication interface 203.

Optionally, the communication apparatus 200 further includes a memory 204. The memory 204 may include a read-only memory and a random access memory, and provide operation instructions and data for the processor 201. A part of the memory 204 may further include a non-volatile random access memory (non-volatile random access memory, NVRAM).

In this embodiment of this application, the communication apparatus 200 performs corresponding operations by invoking the operation instructions (where the operation instructions may be stored in an operating system) stored in the memory 204.

The processor 201 may also be referred to as a central processing unit (central processing unit, CPU).

The processor 201, the communication interface 203, and the memory 204 are coupled together by using a bus system 202. In addition to a data bus, the bus system 202 may further include a power bus, a control bus, a status signal bus, and the like. However, for clear description, various buses are marked as the bus system 202 in FIG. 14.

The method disclosed in the foregoing embodiments of this application may be applied to the processor 201, or may be implemented by the processor 201. The processor 201 may be an integrated circuit chip and is capable of signal processing. In an implementation process, all steps of the foregoing method may be completed by using an integrated logic circuit of hardware in the processor 201 or by using instructions in a software form. The foregoing processor 201 may be a general purpose processor, a digital signal processor (digital signal processor, DSP), an application-specific integrated circuit (application-specific integrated circuit, ASIC), a field-programmable gate array (field-programmable gate array, FPGA) or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 204, and the processor 201 reads information in the memory 204 and completes the steps in the foregoing methods in combination with hardware of the processor 201.

For example, the processing unit 101 in FIG. 13 may be implemented by the processor 201 in FIG. 14, and the communication unit 102 in FIG. 13 may be implemented by the communication interface 203 in FIG. 14.

The foregoing communication unit or communication interface may be an interface circuit or a communication interface in the apparatus for receiving a signal from another apparatus. For example, when the apparatus is implemented as a chip, the communication unit or communication interface is an interface circuit or a communication interface in the chip for receiving a signal from or sending a signal to another chip or apparatus.

In embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state drive, SSD), or the like.

Optionally, an embodiment of this application further provides a computer-readable storage medium, and the computer-readable storage medium stores computer instructions. When the computer-readable storage medium is run on a computer, a computer is enabled to perform the route configuration methods provided in embodiments of this application.

An embodiment of this application further provides a computer program product that includes computer instructions. When the computer program product is run on a computer, the computer is enabled to perform the route configuration methods provided in embodiments of this application.

An embodiment of this application provides a chip. The chip includes a processor. When the processor executes instructions, the chip is enabled to perform the route configuration methods provided in embodiments of this application.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state drive, SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A route configuration method, wherein the method comprises:

determining, by a session management network element, that a first terminal in a first group is allowed to communicate with a second terminal in a second group; and sending, by the session management network element, first forwarding information to a first user plane network element, wherein the first user plane network element is configured to provide a service for the first terminal, the first forwarding information is useable by the first user plane network element to forward a first packet, and the first packet is to be sent by the first terminal to the second terminal, wherein the first group is a first $5^{th}$ generation virtual network (5GVN) group, the second group is a second 5GVN group, and the first group and the second group are not the same group.

2. The route configuration method according to claim 1, wherein the first forwarding information is useable by the first user plane network element to forward the first packet to a second user plane network element in response to the first user plane network element and the second user plane network element being different user plane network elements, and the second user plane network element is configured to provide a service for the second terminal.

3. The route configuration method according to claim 1, wherein the first forwarding information is useable by the first user plane network element to forward the first packet to a first access network device in response to the first user plane network element and a second user plane network element being a same user plane network element, the second user plane network element is configured to provide a service for the second terminal, and the first access network device is configured to be accessed by the second terminal.

4. The route configuration method according to claim 1, wherein the first forwarding information is useable by the first user plane network element to forward the first packet to a first forwarding device, and the first forwarding device is configured to forward a packet destined for one or more terminals in the second group.

5. The route configuration method according to claim 4, wherein the first forwarding device is a user plane network element configured to provide a service for the one or more terminals in the second group.

6. The route configuration method according to claim 4, wherein the method further comprises:

sending, by the session management network element, first forwarding information to the first forwarding device, wherein the first forwarding information is useable by the first forwarding device to forward the first packet.

7. The route configuration method according to claim 6, the first forwarding information is useable by the first forwarding device to forward the first packet to a second user plane network element in response to the first forwarding device being a device other than the second user plane network element.

8. The route configuration method according to claim 1, wherein the method further comprises:

sending, by the session management network element, second forwarding information to a second user plane network element, wherein the second forwarding information is useable by the second user plane network element to forward a second packet, the second packet is to be sent by the second terminal to the first terminal, and the second user plane network element is configured to provide a service for the second terminal.

9. The route configuration method according to claim 1, wherein the second terminal is in the second group, and the second terminal is configured to have permission to communicate with the first terminal, and the second terminal is configured in an online state.

10. The route configuration method according to claim 9, wherein the method further comprises:

obtaining, by the session management network element, a terminal in the second group that is configured with permission to communicate with the first terminal; and determining, by the session management network element, the terminal that is configured with an online state from the terminal that is configured with permission to communicate with the first terminal.

11. A session management network element, comprising:

at least one processor; and a memory coupled to the at least one processor, the memory configured to store non-transitory instructions, and the at least one processor being configured to execute the non-transitory instructions to thereby cause the session management network element to:

determine that a first terminal in a first group is allowed to communicate with a second terminal in a second group; and send first forwarding information to a first user plane network element, wherein the first user plane network element is configured to provide a service for the first terminal, the first forwarding information is useable by the first user plane network element to forward a first packet, and the first packet is to be sent by the first terminal to the second terminal, wherein the first group is a first $5^{th}$ generation virtual network (5GVN) group, the second group is a second 5GVN group, and the first group and the second group are not the same group.

12. The session management network element according to claim 11, wherein the first forwarding information is useable by the first user plane network element to forward the first packet to a second user plane network element in response to the first user plane network element and the second user plane network element being different user plane network elements, and the second user plane network element is configured to provide a service for the second terminal.

13. The session management network element according to claim 11, wherein the first forwarding information is useable by the first user plane network element to forward the first packet to a first forwarding device, and the first forwarding device is configured to forward a packet destined for one or more terminals in the second group.

14. The session management network element according to claim 13, wherein the first forwarding device is a user plane network element configured to provide a service for the one or more terminals in the second group.

15. The session management network element according to claim 11, wherein the at least one processor being further configured to execute the non-transitory instructions to further cause the session management network element to:

send second forwarding information to a second user plane network element, wherein the second forwarding information is useable by the second user plane network element to forward a second packet, the second packet is to be sent by the second terminal to the first terminal, and the second user plane network element is configured to provide a service for the second terminal.

16. The session management network element according to claim 11, wherein the second terminal is in the second group, and the second terminal is configured to have permission to communicate with the first terminal, and the second terminal is configured in an online state.

17. The session management network element according to claim 16, wherein the at least one processor being further configured to execute the non-transitory instructions to further cause the session management network element to:

obtain a terminal in the second group that is configured with permission to communicate with the first terminal; and determine the terminal that is configured with an online state from the terminal that is configured with permission to communicate with the first terminal.

18. A communication system comprising a first user plane network element and a session management network element, the first user plane network element being configured to provide a service for a first terminal and a second terminal, the first terminal being configured to belong to a first group, and the second terminal being configured to belong to a second group;

the session management network element is configured to: determine that the first terminal is allowed to communicate with the second terminal; and send first forwarding information to the first user plane network element, wherein the first forwarding information is useable by the first user plane network element to forward a first packet to a first access network device, the first packet is to be sent by the first terminal to the second terminal, and the first access network device is configured to be accessed by the second terminal; and the first user plane network element is configured to: receive the first forwarding information, and store the first forwarding information, wherein the first group is a first $5^{th}$ generation virtual network (5GVN) group, the second group is a second 5GVN group, and the first group and the second group are not the same group.

19. The communication system according to claim 18, wherein the session management network element is further configured to send second forwarding information to the first user plane network element, wherein the second forwarding information is useable by the first user plane network element to forward a second packet to a first access network device, the second packet is to be sent by the second terminal to the first terminal, and the first access network device is configured to be accessed by the first terminal; and the first user plane network element is further configured to: receive the second forwarding information, and store the second forwarding information.

20. The communication system according to claim 18, wherein the communication system further comprises a second user plane network element, and the second user plane network element being configured to provide a service for a third terminal in the second group;

the session management network element is further configured to: determine that the first terminal is allowed to communicate with the third terminal; and send second forwarding information to the first user plane network element, wherein the second forwarding information is useable by the first user plane network element to forward a second packet to the second user plane network element, and the second packet is to be sent by the first terminal to the third terminal; and the first user plane network element is further configured to: receive the second forwarding information, and store the second forwarding information.

* * * * *